United States Patent
Taylor et al.

(10) Patent No.: US 9,880,919 B2
(45) Date of Patent: Jan. 30, 2018

(54) AGGREGATION OF METRICS DATA WITH FINE GRANULARITY

(71) Applicant: Amazon Technologies, Inc., Seattle, WA (US)

(72) Inventors: Gary Taylor, Dublin (IE); Brian Dennehy, Dublin (IE); Sebastien Alexandre Roland Rodriguez, Dublin (IE); Julio Delgado Mangas, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/752,752

(22) Filed: Jun. 26, 2015

(65) Prior Publication Data
US 2016/0378800 A1    Dec. 29, 2016

(51) Int. Cl.
| | | |
|---|---|---|
| *G06F 9/46* | (2006.01) | |
| *G06F 11/34* | (2006.01) | |
| *G06F 17/40* | (2006.01) | |
| *G06F 11/00* | (2006.01) | |

(52) U.S. Cl.
CPC .............. *G06F 11/34* (2013.01); *G06F 11/00* (2013.01); *G06F 17/40* (2013.01)

(58) Field of Classification Search
None
See application file for complete search history.

(56) References Cited

U.S. PATENT DOCUMENTS

| | | | | |
|---|---|---|---|---|
| 2012/0078881 A1* | 3/2012 | Crump | .............. | G06F 17/30489 707/722 |
| 2016/0085792 A1* | 3/2016 | Dukes | ............... | G06F 17/30336 707/692 |

FOREIGN PATENT DOCUMENTS

WO    WO2013184935    12/2013

OTHER PUBLICATIONS

"Auto Scaling Developer Guide API Version Jan. 1, 2011," Jan. 2, 2014, Amazon.*
"Amazon CloudWatch Developer Guide API Version Aug. 1, 2010," Sep. 6, 2013, Amazon.*
Amazon, "Amazon CloudWatch Developer Guide," Nov. 10, 2014, retrieved on Oct. 6, 2016, from https://awsdocs.s3.amazonaws.com/AmazonCloudWatch/latest/acw-dg.pdf, 236 pages.
Hewitt, "Cassandra: The Definitive Guide," Nov. 1, 2010, O'Reilly, XP055308367, ISBN: 978-1-4493-9041-9, 330 pages.

(Continued)

*Primary Examiner* — Sisley Kim
(74) *Attorney, Agent, or Firm* — Davis Wright Tremaine LLP

(57) ABSTRACT

A computing resource monitoring service receives a request to store metrics data. The request includes the metrics data and a fully qualified metric identifier generated based at least in part on metadata included in an earlier request to store other metrics data for the same metric. The service uses the fully qualified metric identifier to identify an aggregator datastore for storing the metrics data. Once the service has identified the aggregator datastore, the service accesses the aggregator datastore to store the metrics data such that the metrics data and the other metrics data can be obtained in response to a request to obtain data for the metric, where the request includes the metadata.

19 Claims, 14 Drawing Sheets

(56) References Cited

OTHER PUBLICATIONS

International Search Report and Written Opinion dated Oct. 17, 2016, International Patent Application No. PCT/US2016/039371, filed Jun. 24, 2016.
Trihinas et al., "JCatascopia: Monitoring Elastically Adaptive Applications in the Cloud," 2014 14th IEEE/ACM International Symposium on Cluster, Cloud and Grid Computing, May 26, 2014, pp. 226-235.
Wikipedia, "Distributed hash table," from Wikipedia, the free encyclopedia, dated Jun. 9, 2015, retrieved on Oct. 5, 2016, from https://web.archive.org/web/20150609172655/https://en.wikipedia.org/wiki/Distributed_hash_table, 6 pages.

* cited by examiner

AGGREGATION OF METRICS DATA WITH FINE GRANULARITY

This application incorporates by reference for all purposes the full disclosure of co-pending U.S. patent application Ser. No. 14/752,754, filed concurrently herewith, entitled "DATASTORE FOR AGGREGATED MEASUREMENTS FOR METRICS," co-pending U.S. patent application Ser. No. 14/752,759, filed concurrently herewith, entitled "ARCHITECTURE FOR METRICS AGGREGATION WITHOUT SERVICE PARTITIONING," co-pending U.S. patent application Ser. No. 14/752,760, filed concurrently herewith, entitled "AUTOMATIC SCALING OF COMPUTING RESOURCES USING AGGREGATED METRICS," and co-pending U.S. patent application Ser. No. 14/752,756, filed concurrently herewith, entitled "RETRIEVAL OF AUTHORITATIVE MEASUREMENT DATA FROM IN-MEMORY DATASTORES."

BACKGROUND

Customers and administrators of a computing resource service provider, as well as other users of computing resources of the computing resource service provider often utilize monitoring services to measure, diagnose, and improve how they operate their computing resources. For instance, through these monitoring services, customers, administrators, and other users can obtain data for their computing resources and use this data to determine whether their computing resources are functioning properly. If their computing resources are not functioning properly, the data can be used to identify and enable customers, administrators, and other users to troubleshoot any issues that may be present. However, during high impact operational events, time is often of the essence. Monitoring computing resources in a distributed system is very complex, and the complexity grows with the size of the distributed system. As a result, conventional techniques for monitoring computing resources often result in significant latencies between when data indicative of an issue is obtained and when that data is available for consumption. Some customers, administrators, and other users may need to acquire data rapidly to track their computing resources and address any issues as soon as possible.

BRIEF DESCRIPTION OF THE DRAWINGS

Various embodiments in accordance with the present disclosure will be described with reference to the drawings, in which.

DETAILED DESCRIPTION

Figure 1:
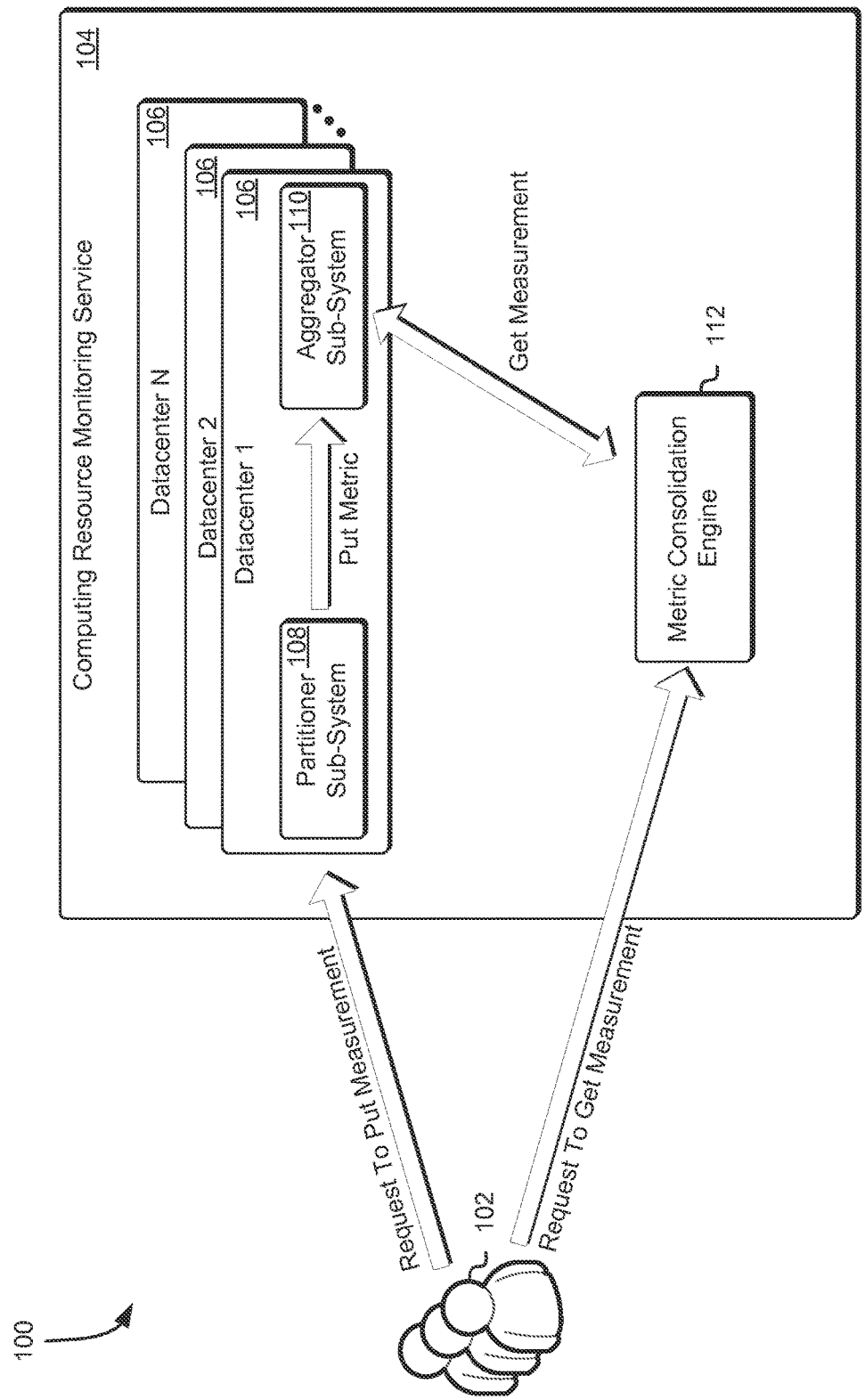
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to a computing resource monitoring service configured to aggregate measurements for metrics and store the aggregated measurements in memory during a retention period specified by a service provider. The computing resource monitoring service may include a front-end server, which may be configured to obtain measurements from a variety of different sources, including customers of the computing resource service provider, various other services of the computing resource service provider, and computing resources made available to the customers through the various services. This front-end server may transform these measurements into a binary serialization format that can be utilized by the various components of the computing resource monitoring service. Once the transformation of the measurements is completed, the front-end service may publish these measurements to various partitioner sub-systems to divide the measurements based on a fully qualified metric identifier (FQMI) for each measurement or metric and the timestamp for the measurement for distribution to various aggregator datastores.

A partitioner sub-system may store the measurements in various queues based on the FQMI. Each queue may be associated with a respective aggregator sub-system for storage of the measurements into the various aggregator datastores utilized to support application programming interface (API) calls to the computing resource monitoring service to retrieve measurements. The partitioner sub-system may further partition the measurements within each queue based on the timestamp for each measurement. This enables the partitioner sub-system to prioritize delivery of the measurements to the aggregator sub-systems based on the timestamps, delivering the most recent measurements first. Further, the partitioner sub-system may purge measurements from the various queues if the timestamp for this data is earlier than the oldest retention period. For measurements with timestamps in the future (e.g., beyond the latest retention period), the partitioner sub-system may queue these measurements in a separate unpartitioned queue, where a measurement will remain until the timestamp for the measurement is covered by the present retention period at a later time. Once the retention period has been updated, measurements with timestamps within this retention period may be transferred from the separate unpartitioned queue and processed.

The aggregator sub-system may obtain the measurements from various queues of the partitioner sub-systems and aggregate these measurements for a retention period. When an aggregator sub-system obtains the measurements from various partitioner sub-systems, the aggregator sub-system may obtain existing measurements and determine whether any of the existing measurements correspond to a time period earlier than the oldest retention period. If so, the aggregator sub-system may purge these existing measurements. The aggregator sub-system may store the measurements obtained from the partitioner sub-systems within various file-based queues for asynchronous processing by the aggregator datastores of the aggregator sub-system. This aggregation of the newly obtained measurements with existing measurements may be performed through deserialization of the existing measurements and the newly obtained measurements and aggregating the newly obtained measurements with the remaining measurements into a serialized format. This serialized data may then be stored within an aggregator datastore.

When a customer of the computing resource service provider submits an API call to the front-end server to retrieve measurements from the computing resource monitoring service (e.g., GET, etc.), the front-end server may transmit a request to the aggregator sub-systems to obtain the measurements. This may cause the various aggregator sub-systems to each access a metric mapping registry to determine where the requested measurements are stored. The aggregator sub-systems may then access their respective aggregator datastores to obtain the requested measurements and provide these measurements to a metric consolidation engine. This metric consolidation engine may compile the measurements from the aggregator sub-systems and provide these measurements to the front-end server. The front-end server may fulfill the customer's request by providing the compiled measurements from the metric consolidation engine.

In this manner, the computing resource monitoring service may ingest measurements for various metrics from a variety of sources, compute real time analytics and provide measurements to customers, administrators, and other entities to enable rapid response to any inherent computing resource issues and to allow metrics evaluation in a short amount of time. In addition, the techniques described and suggested herein facilitate additional technical advantages. For example, because measurements ingested by the computing resource monitoring service are divided and placed into logical partitions for distribution to the various partitioner sub-systems, any failure of a partitioner sub-system may result in minimal impact to the overall aggregation of measurements by the computing resource monitoring service. This may ensure that customers of the computing resource service provider may store measurements for the retention period quickly with minimal risk of significant data loss.

FIG. 1 shows an illustrative example of an environment 100 in which various embodiments can be implemented. In the environment 100, one or more customers 102 (e.g., individuals, organizations, automated processes, computing resource agents, etc.) of a computing resource service provider may submit a request to a computing resource monitoring service 104 to store a measurement of a particular metric for a computing resource. The request to store the measurement may be provided in the form of an API call to the computing resource monitoring service 104, such as a PUT call. In an embodiment, the initial request to store the measurement includes metadata that can be used to describe the measurement that is being provided to the computing resource monitoring service 104. For instance, the metadata may specify the name of the originating computing resource that has generated the data, an auto-scaling group to which the originating computing resource belongs to, a virtual machine image identifier for the originating computing resource, and the like. Upon receiving the measurement and the metadata through the API call to store the measurement, the computing resource monitoring service 104 may generate a hash of the metadata, which may be used to index the measurement upon storage. A measurement may be a numerical value from a scale of possible values, a Boolean value, or an alphanumeric or other indicator of a state of a set of possible states. The measurement may further serve as an indication of at least one aspect of the operation of an associated computing resource, such as virtual machine instances, customer computer systems, object-based datastores and/or other computing resources. For instance, measurements may include processor usage over time, memory usage over time, a count for errors detected within a computing resource over a period of time, and the like.

In an embodiment, the computing resource monitoring service 104 includes one or more partitioner sub-systems 108 and one or more aggregator sub-systems 110 within each datacenter 106 of the computing resource monitoring service 104 for storage of the measurement. Each datacenter 106 may correspond to a physical location where computer systems of the computing resource monitoring service 104, as well as other computer systems for services of the computing resource service provider, may be located. When the computing resource monitoring service 104 obtains the measurement from a customer 102, the computing resource monitoring service 104 may utilize the provided metadata to identify the computing resource that has generated the data and determine the datacenter 106 where this computing resource is located. Based at least in part on this determination, the computing resource monitoring service 104 may select a corresponding datacenter 106 for storage of the data. In some embodiments, the computing resource monitoring service 104 replicates the measurement for storage in a subset of a plurality of datacenters 106 to provide redundancy for the measurement. This may enable the computing resource monitoring service 104 to generate one or more conflict resolution rules in order to select a particular measurement if the subset of the plurality of datacenters 106 is unable to provide a consistent measurement answer in response to a request. For instance, the computing resource monitoring service 104 may require a quorum where the computing resource monitoring service 104 may select the measurement that is provided by the most datacenters 106 so long as the number of datacenters 106 providing the same measurement is greater than or equal to a predetermined number of datacenters 106.

The metadata for the measurement provided to the computing resource monitoring service 104 may uniquely identify the particular metric for the measurement. For instance, the metadata may uniquely identify the measurement by a combination of a customer account number, the namespace (e.g., associated service for the computing resource), the dimensions for the measurement (e.g., key/value pairs), the name of the measurement itself, and the like. In an embodiment, when the computing resource monitoring service 104 receives the measurement and metadata from the customer 102, the computing resource monitoring service 104 utilizes a hash function to generate a hash of the metadata, which can be used as an FQMI for the measurement that is to be stored. Further, the computing resource monitoring service 104 may utilize a binary serialization format to compress the measurement to be stored. In this binary serialization format, the serialized measurement may include the FQMI generated by hashing the metadata, the timestamp for the data, the unit of measurement for the data, and the measurement itself. In an alternative embodiment, the customer 102, through use of a customer computer system or other computing resource, calculates the FQMI based at least in part on the metadata for the measurement. This may enable the customer 102 to provide the measurement with the FQMI for the measurement without requiring the computing resource monitoring service 104 to generate the FQMI itself.

In an embodiment, once the computing resource monitoring service 104 has hashed the metadata to generate the FQMI for the measurement to be stored, the customer 102 is no longer required to repeat the metadata for future submissions of the measurements for the particular metric, so long as the metadata has not expired or the customer 102 has not initiated a new session with the computing resource monitoring service 104. For instance, when a customer 102 supplies additional measurements to the computing resource monitoring service 104, the customer 102 may provide the FQMI for the measurements corresponding to the same metric instead of the metadata. The computing resource monitoring service 104 may serialize the measurements and the FQMI in anticipation of storage of the various measurements within the datastores of the computing resource monitoring service 104. The computing resource monitoring service 104 may provide the customer 102 with the FQMI for the measurements in response to the customer's request to store a first measurement that includes metadata for the measurement. Once the computing resource monitoring service 104 generates the FQMI based at least in part on the metadata provided by the customer 102, the computing resource monitoring service 104 may transmit the FQMI to the customer 102 for future use, include PUT and GET requests.

The API call that may be made to the computing resource monitoring service 104 for storage of the measurement (e.g., an observation for a metric) may further include one or more parameters that may be used to specify that the data provided for a particular time series for the metric is authoritative for the time series. For instance, as measurements for a metric are aggregated for a particular retention period, the customer 102 may specify that for the time series, the provided one or more measurements are authoritative for the time series such that the computing resource monitoring service 104 may indicate, to an entity requesting the measurements, that the provided measurement for the time series is in fact authoritative and steady. In an embodiment, when the computing resource monitoring service 104 receives an API call including the one or more parameters usable to specify that the measurement provided is authoritative for the time series, the computing resource monitoring service 104 will make the various measurements for the time series available once the received measurement has been aggregated with other measurements for the time series and stored. This measurement, as well as other measurements for the time series, may be available to the customer 102 or other entities such that the computing resource monitoring service 104 may indicate that these measurements are authoritative for the time series.

Once the computing resource monitoring service 104 has transformed the measurement into a serialized format, the computing resource monitoring service 104 may transmit the measurement to one or more partitioner sub-systems 108 within each datacenter 106. In an embodiment, each partitioner sub-system 108 determines, based at least in part on the FQMI and the timestamp for the measurement, which logical partition of a plurality of logical partitions will be used for storing the measurement. For various measurements received, the partitioner sub-system 108 may split these various measurements into various logical partitions further based at least in part on a number of active aggregator sub-systems 110 within the datacenter 108 for one or more retention periods. In order to determine the number of active aggregator sub-systems 110, the partitioner sub-system 108 may access a metric mapping registry, which may provide a mapping of logical partitions to the aggregator sub-systems 110 active for the one or more retention periods. The partitioner sub-system 108 may store the measurement within a file-based queue associated with the selected logical partition, bound to a single aggregator sub-system 110 within the datacenter 106.

The file-based queue may include various measurements, which may be batched and delivered asynchronously to the corresponding aggregator sub-system 110 after a period of time has passed (e.g., every few milliseconds, etc.). The measurements within these file-based queues may be delivered to only one aggregator sub-system 110 per datacenter 106 during each retention period, as determined through the metric mapping registry. The measurements within the file-based queues may be further sub-partitioned based at least in part on the observation time for each measurement. This may enable the partitioner sub-system to deliver the measurements to the aggregator sub-systems 110 in a manner that prioritizes delivery of the most recent measurement first. Measurements with timestamps in the future (e.g., beyond the latest time series of the latest retention period)

may be queued in a separate unpartitioned queue that may be processed only when the time series becomes current. Additionally, the partitioner sub-system 108 may purge measurements with timestamps that are earlier than the oldest retention period.

An aggregator sub-system 110 is an in-memory key-value storage system that may be optimized for aggregating measurements and serving time series measurement data for various metrics. In an embodiment, the in-memory key-value storage system relies on main memory of one or more computer systems for storage of aggregated measurements. For instance, the in-memory key-value storage system may be directly or indirectly connected to a central processing unit (CPU) of a computer system via a memory bus. This may enable the CPU to obtain any data stored within the in-memory key-value storage system in response to GET requests or to store any data within the in-memory key-value storage system in response to GET requests. The main memory may also be directly accessible to the CPU. The in-memory key-value storage system may be formed using volatile storage systems (e.g., Random Access Memory (RAM), etc.) or non-volatile storage systems. In some embodiments, the measurements may be stored in solid state storage, such as solid state drives (SSDs).

The aggregator sub-system 110 may obtain a plurality of measurements from various partitioner sub-systems 108 within a datacenter 106 and may place the measurements into file-based queues for asynchronous processing. If it is the first time that a particular metric has been observed for an aggregation period, the aggregation sub-system 110 may store the measurement for this particular metric in its serialized format within an aggregator datastore. Alternatively, if the particular metric has been previously observed, the aggregator sub-system 110 may obtain the stored measurements for the metric, de-serialize the stored measurements and the newly obtained measurements, and aggregate the newly obtained measurements with the existing measurements in the serialized format. These aggregated measurements may then be stored within the aggregator datastore for fulfillment of query requests. In an embodiment, the aggregator sub-system 110 will purge any expired measurements from the aggregator datastores once the oldest retention period has been replaced with a later retention period for storage of the measurements.

At any time, a customer 102 of the computing resource service provider may transmit a request to the computing resource monitoring service 104 to retrieve any number of measurements from the various aggregator datastores. The request to retrieve the measurements may be provided in the form of an API call to the computing resource monitoring service 104, such as a GET call. In order for the computing resource monitoring service 104 to obtain the measurements necessary to fulfill the request, the customer 102 may be required to provide the metadata for the measurements that are to be obtained. This may enable the computing resource monitoring service 104 to hash the metadata to obtain the one or more FQMIs for the measurements. The computing resource monitoring service 104 may utilize the one or more FQMIs to identify, from the metric mapping registry, the one or more locations of the measurements for the one or more current retention periods.

In an embodiment, the API call from the customer 102 to the computing resource monitoring service 104 to retrieve measurement data (e.g., one or more measurements for a metric) from the various aggregator datastores can include a parameter, which may be used to indicate that the customer 102 is requesting authoritative results. For instance, if the API call includes the parameter for requesting authoritative results for a particular time range and metric, the computing resource monitoring service 104 may retrieve the measurements for the metric within the specified time range and determine whether any of these measurements are authoritative. For instance, as noted above, a customer 102, through use of the PUT API call, may specify that a particular measurement or series of measurements are authoritative for a time series. The computing resource monitoring service 104 may utilize this information to identify the authoritative measurements and provide these to the customer 102 or other requesting entity. In some embodiments, the customer 102 can submit a GET API call that includes a parameter for indication that the customer 102 is agnostic to obtaining the authoritative measurements for a particular time range. This may cause the computing resource monitoring service 104 to provide all measurements for the specified time range regardless of whether the measurements are authoritative or not.

Upon determining the locations where the requested measurements are stored, the computing resource monitoring service 104 may utilize a metric consolidation engine 112 to transmit requests to the appropriate aggregator sub-systems 110 from the various datacenters 106 to obtain the measurements necessary to fulfill the GET request. The metric consolidation engine 112 may be a computer system module of the computing resource monitoring service 104, which may include a client library to enable the module to read measurements from the various aggregator sub-systems 110. Once the metric consolidation engine 112 has obtained the measurements from the various aggregator sub-systems 110, the measurements from each datacenter 106 may be compiled to generate a datacenter 106 measurement response. The metric consolidation engine 112 may utilize one or more conflict resolution rules to determine the appropriate response to the GET request if the generated responses are in conflict. For instance, the metric consolidation engine 112 may select the response with the highest sample count from the various datacenters 106. The metric consolidation engine 112 may provide a response to the GET request in the form of the measurements in a de-serialized format that may be used by the customer 102 for its own purposes.

In an embodiment, the metric consolidation engine 112 is configured to provide these measurements to an auto-scale group comprising one or more server computers and computing resources. The measurements may be obtained by the metric consolidation engine 112 in response to GET requests from one or more computing resource managers within the auto-scale group for metrics associated with the computing resources within the group. These one or more computing resource managers may utilize the obtained measurements for the particular metrics to determine whether scaling of existing computing resources is necessary. If so, the computing resource managers within each server computer in the auto-scale group may provision additional computing resources or remove computing resources from the auto-scale group as needed.

It should be noted that in some embodiments, the partitioner sub-systems 108 are utilized within one or more client-side computing systems of the customer 102. For instance, the client-side computing systems may obtain the measurements from the various computing resources and may hash the metadata for the measurements directly. Further, the customer client device may access the metric mapping registry provided by the computing resource monitoring service 104 to determine which aggregator sub-systems 110 are to receive the measurements stored within the logical partitions of the partitioner sub-systems 108 within the customer client device. The customer client device may transmit a PUT request to the corresponding aggregator sub-systems 110 of the computing resource monitoring service 104 to store the measurements. The measurements may be transmitted using one or more communications protocols that may enable the customer client device to determine whether each measurement has been transmitted successfully to the corresponding aggregator sub-systems 110. If the transmission of the measurements was unsuccessful, the customer client device may refresh the file-based queues of the partitioner sub-systems 108 and transmit a new PUT request to the aggregator sub-systems 110 for each failed request. Otherwise, the customer client device may receive acknowledgment from the aggregator sub-systems 110 that delivery of the measurements has been performed successfully.

Figure 2:
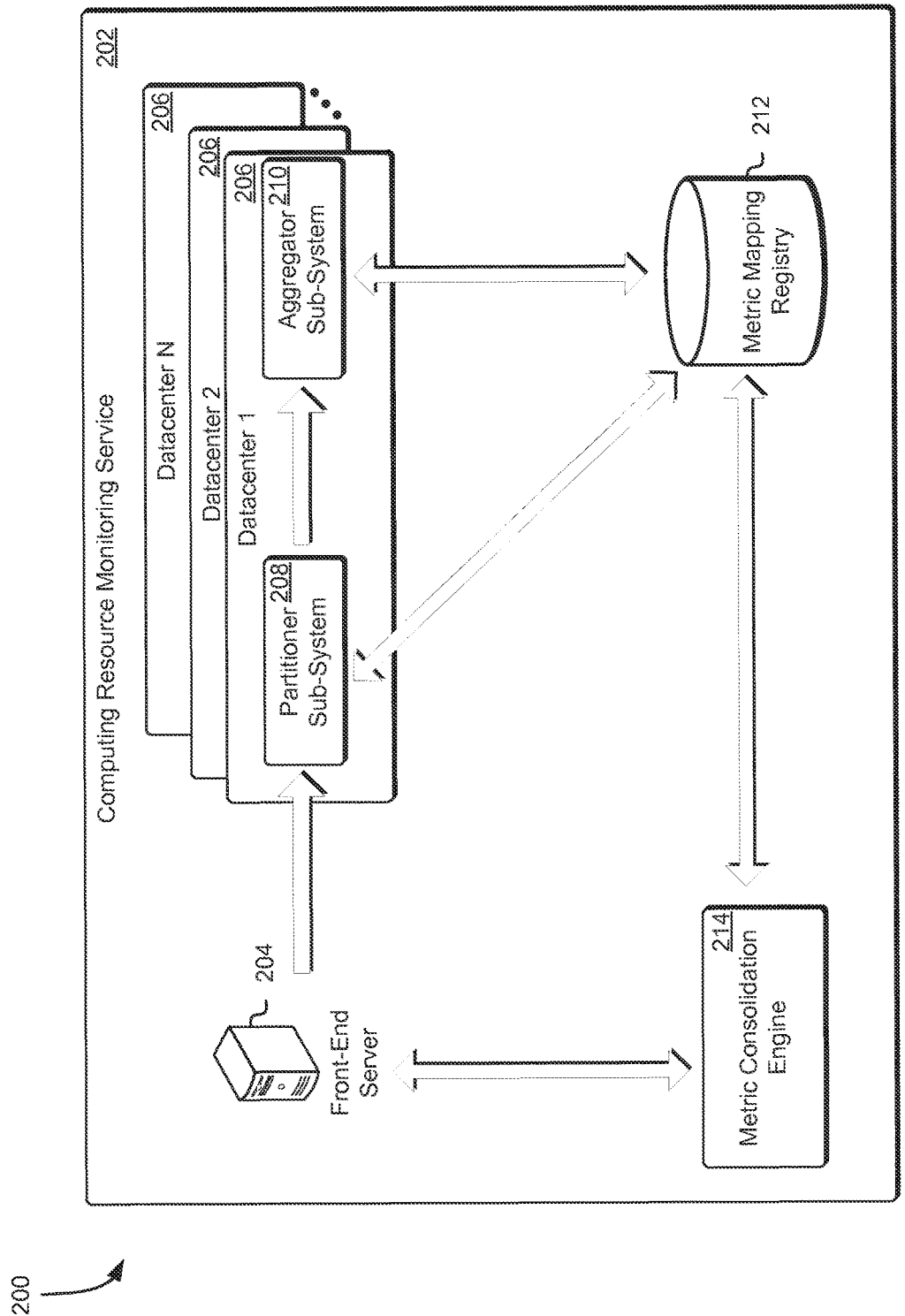
FIG. 2 shows an illustrative example of an environment in which a front-end server of a computing resource monitoring service processes one or more application programming interface calls to store and retrieve measurements from the service in accordance with at least one embodiment.

As noted above, a computing resource monitoring service may obtain measurements from customers, administrators, computing resources, and other entities and store these measurements within one or more aggregator data stores over a particular retention period as defined by the service. The measurements obtained by the computing resource monitoring service may be aggregated as it arrives in real time. This may enable the computing resource monitoring service to respond to requests to obtain measurements from the aggregator datastores in an expeditious manner, enabling the customers and other entities to utilize the measurements for their own needs. Accordingly, FIG. 2 shows an illustrative example of an environment 200 in which a front-end server 204 of a computing resource monitoring service 202 processes one or more API calls to store and retrieve measurements from the service 202 in accordance with at least one embodiment.

In the environment 200, a front-end server 204 of the computing resource monitoring service 202 may receive a PUT request from a customer computer system to store a measurement within an aggregator datastore. The customer computer system may be a computer system hosted by a computing resource service provider but managed by a customer. Alternatively, the customer computer system may include computer systems and resources hosted by a customer in its own datacenters. The PUT request may include a measurement for a particular metric at a given timestamp. Additionally, the PUT request may further include metadata for the provided measurement. This metadata may include one or more metric attributes that may uniquely identify the associated measurement and metric within the computing resource monitoring service 202. For instance, the metadata may specify, individually or in combination, the account number of a customer associated with the customer computer system submitting the PUT request or with another computing resource responsible for generation of the measurement, the name of the particular service responsible for managing the computing resource (e.g., virtual computer system service, database service, etc.), the dimensions for the measurement (e.g., key/value pairs), and an identifier for the computing resource producing the measurement.

When the front-end server 204 receives the PUT request from the customer computer system, the front-end server 204 may obtain the metadata from the PUT request and utilize a hash function to generate an FQMI for the measurement that is to be stored within the aggregator datastore. Additionally, the front-end server 204 may transform the measurement into a serialized format for publication to a partitioner sub-system 208 within the one or more datacenters 206. The serialized format for a particular measurement obtained from the customer computer system may include the FQMI, the timestamp for the measurement, the unit of measurement for the measurement, and the measurement itself. The front-end server 204 may spool unpartitioned measurements from various PUT requests for asynchronous delivery to the one or more partitioner sub-systems 208 of the one or more datacenters 206. For instance, the front-end server 204 may include one or more file-based queues that may each be configured to transmit the measurements to at least one partitioner sub-system 208 of the partitioner sub-systems 208 maintained within each datacenter 206.

In an embodiment, if a customer computer system submits a later PUT request to store a measurement for the same metric, the customer computer system is only required to provide the FQMI for the metric instead of the complete metadata from the measurement, as long as the metadata has not expired. Alternatively, the PUT request may lack at least some of the metadata that was received within the initial PUT request to store another measurement for the same metric. As will be described in greater detail below, the one or more partitioner sub-systems 208 may utilize the provided FQMI to store the measurement within an aggregator datastore such that information responsive to a request to retrieve measurements and that specifies the metadata includes at least both measurements.

The PUT request may further provide the customer computer system with a variety of options for storage of the provided measurement. For instance, in an embodiment, the PUT API may enable the customer computer system to specify whether the provided measurement is the last measurement to be provided for a particular metric over a period of time for aggregation of measurements by the computing resource monitoring service 202. For instance, through the PUT API, if the front-end server 204 is configured to batch measurements for a particular time interval (e.g., one second, one minute, one hour, etc.) prior to delivery to the partitioner sub-systems 208, a customer computer system may specify that the provided measurement is the final measurement for the particular time interval. This may cause the front-end server 208 to prepare the measurements for delivery to the partitioner sub-systems 208 even through the current time interval has not elapsed. This may enable faster storage and availability of measurements, as the front-end server 204 may not be required to wait for additional measurements from the customer computer system. In another embodiment, the front-end server 204 will utilize run length encoding to compress the obtained measurements for one or more sequential measurements having a same value over a time interval for the measurements. This may reduce the storage space required for the serialized measurements.

In an embodiment, the front end server 204 sends the serialized measurement generated based at least in part on the received PUT request to each datacenter 206 for redundant storage of the measurement. Each datacenter 206 may include a partitioner load balancer (not shown) that may be configured to transmit the serialized measurement to a partitioner sub-system 208 within the particular datacenter 206. The partitioner sub-system may include one or more computer systems collectively configured to partition measurements for various metrics based at least in part on the FQMI and timestamp of each measurement for delivery to the one or more aggregator sub-systems 210 within the datacenter 206. The partitioner sub-system 208, upon obtaining the measurement from the front-end server 204, may access a metric mapping registry 212 to obtain a mapping of logical partitions to aggregator sub-systems 210 within the datacenter 206 over time. The metric mapping registry may include a database for the mapping and one or more computer systems for creating partition schedules based at least in part on available aggregator sub-systems 210 within each datacenter. For instance, the metric mapping registry 212 may evaluate the various aggregator sub-systems 210 within the various datacenters 206 at predetermined (e.g., defined by the computing resource monitoring service 202 or the computing resource service provider) time intervals. This evaluation may be used to generate the partition schedule for a time in the future. In some embodiments, the partition schedule can be updated manually in order handle emergent issues with aggregator sub-system 210 availability, required throughput for storage of the measurements, and other issues. The mapping may correspond to a particular retention period for which it is active. Once the retention period has elapsed, the metric mapping registry 212 may make the next mapping current while keeping a history of the recent changes to the partition schedule to enable GET requests to be routed to the correct aggregator sub-systems 210.

The partitioner sub-system 208 may utilize the mapping from the metric mapping registry 212 to determine, for each logical partition, a destination aggregator sub-system 210 for the partitioned measurements. The partitioner sub-system 208 may select, based at least in part on the FQMI and timestamp of the measurement obtained through the PUT request, a logical partition from the plurality of logical partitions for storage of the measurement. As noted above, the FQMI may be created using a hash function to hash the metric attributes provided in the metadata. For instance, the FQMI may include a multiple-byte hash, wherein a portion of the hash is used to determine the logical partition for each measurement metric, while another portion of the hash is used for unique identification of the measurement within the logical partition. This logical partition may be mapped to a particular aggregator sub-system 210 by the metric mapping registry 212.

The partitioner sub-system 208 may store the partitioned measurements within file-based queues each bound to a single aggregator sub-system 210 within the datacenter 206. The measurements within each file-based queue may be batched and delivered asynchronously to each aggregator sub-system 210 at certain short time intervals (e.g., every few milliseconds, etc.). This may enable the partitioner sub-system 208 to deliver measurements from each logical partition to only one aggregator sub-system 210 per datacenter 206 during each retention period, as determined by the metric mapping registry 212. Each logical partition may be further sub-partitioned by the measurement timestamp. The partitioner sub-system 208 may prioritize delivery of the most recent measurements to the aggregator sub-systems 210 first. If at any point a file-based queue is filled to capacity, the partitioner sub-system 208 may purge the oldest measurements from the file-based queue. Further, any measurements for timestamps earlier than the oldest retention period may also be purged. The partitioner sub-system 208 may maintain a separate unpartitioned queue for measurements whose timestamps correspond to a time in the future (e.g., the timestamp specifies a time beyond the latest retention period time). These future observations may be processed only when the timestamp for these measurements becomes current and is within the retention period.

As noted above, the aggregator sub-system 210 may be an in-memory key-value storage system optimized for aggregating measurements for various metrics in real time and serving time series measurements for the various metrics.

The aggregator sub-system 210 may obtain the measurements from the logical partitions of the partitioner sub-systems 208 within the particular datacenter 206 and place these measurements into one or more file-based queues for asynchronous processing by dedicated aggregator datastores of the aggregator sub-system 210. The aggregator datastore may obtain a measurement for a metric from the file-based queue and determine whether there are existing measurements for the particular metric over an aggregation period. If there are no existing measurements for the particular metric, the aggregator datastore may store the serialized measurement and the aggregator sub-system 210 may update the metric mapping registry 212 to indicate that the serialized measurement has been successfully stored within the datastore. Otherwise, the aggregator sub-system 210 may retrieve the existing serialized measurements from the aggregator datastore and de-serialize these measurements and the newly obtained measurements from the queue. The aggregator sub-system 210 may aggregate the two de-serialized sets of measurements. These aggregated measurements may then be serialized and stored within the aggregator datastore. The aggregator sub-system may update the metric mapping registry 212 to indicate that storage of the measurements from the logical partition was performed successfully.

At any time, the front-end server 204 may receive a GET request from a customer computer system, computing resource, administrator, or other authorized entity to retrieve measurements for a particular metric from the one or more aggregator datastores in the one or more aggregator sub-systems 210. The GET request may include metadata for the measurements to be obtained from the computing resource monitoring service 202, which may be similar to metadata provided at an earlier time to store a measurement for the metric. The front-end server 204 may hash the received metadata to generate an FQMI that can be used to locate the measurements being sought. The front-end server 204 may transmit a query, along with the FQMI, to the metric consolidation engine 214 in order to obtain the measurements required to fulfill the GET request. In response to the query, the metric consolidation engine 214 may access the metric mapping registry 212 to determine where the measurements needed to fulfill the GET request are stored.

In order to determine the aggregator sub-systems 210 that have the measurements necessary to fulfill the GET request, the metric consolidation engine 214 may provide the FQMI to the metric mapping registry 212. The metric mapping registry 212 may analyze the current mapping and past mappings for a number of retention periods to determine where the measurements are stored. Once the metric consolidation engine 214 determines, based at least in part on the information provided by the metric mapping registry 212, the aggregator datastores from the aggregator sub-systems 210 where the measurements are stored, the metric consolidation engine 214 may access the aggregator datastores within each datacenter 206 to obtain the requested measurements.

In an embodiment, the metric consolidation engine 214 compiles the measurements obtained from each of the datacenters 206. If the compiled measurements for the datacenters 206 are inconsistent, the metric consolidation engine 214 may utilize one or more conflict resolution rules to determine which measurements are to be provided in response to the GET request. For instance, the metric consolidation engine 214 may select the response with the highest sample count from the various datacenters 206. Once the metric consolidation engine 214 has resolved any conflicts among the datacenters, if any, the metric consolidation engine 214 may provide the measurements to the front-end server 204. This may enable the front-end server 204 to fulfill the GET request by providing the measurements to the requesting entity.

The front-end server 204, in some embodiments, is further configured to provide measurements for various metrics to one or more computing resource managers of an auto-scale group once the measurements have been aggregated. The metric mapping registry 212 may maintain one or more entries for computing resources of the auto-scale group, which may specify, for each retention period, the aggregator datastores within the various datacenters 206 that include measurements for these computing resources. Additionally, the metric consolidation engine 214 may be configured to periodically access the metric mapping registry 212 to identify these aggregator datastores that include these measurements. This may enable the metric consolidation engine 212 to obtain the measurements for these computing resources and provide the measurements to the front-end server 204. The front-end server 204 may transmit the measurements to the one or more computing resource managers of the auto-scale group to enable the computing resource managers to scale the computing resources accordingly. In some instances, the one or more computing resource managers may instead transmit GET requests to the front-end server 204, which may fulfill the GET request by performing the process described above to obtain the requested measurements for the one or more computing resources.

Figure 3:
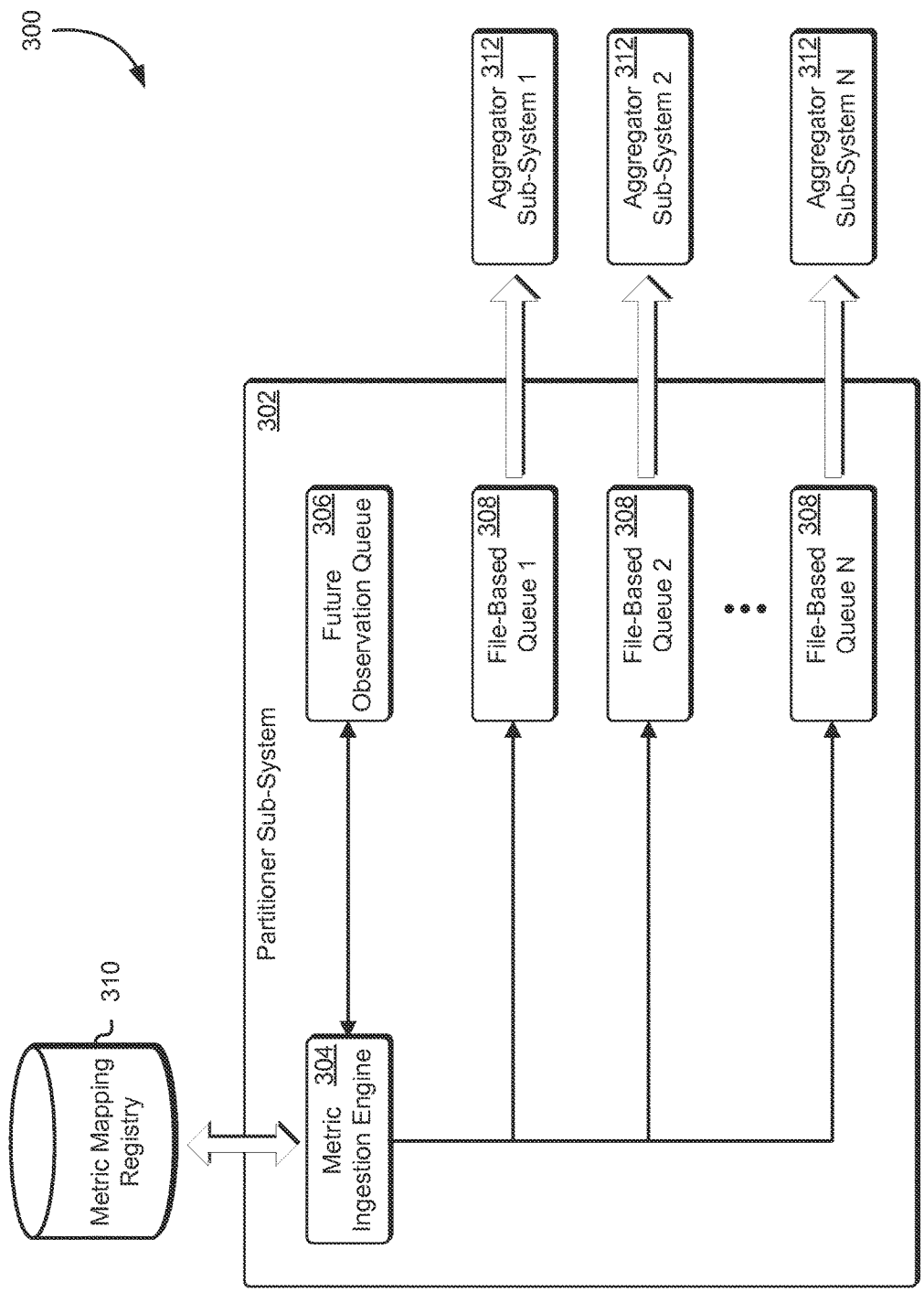
FIG. 3 shows an illustrative example of an environment in which a partitioner sub-system of a computing resource monitoring service partitions measurements into various logical partitions and delivers measurements in each logical partition to an aggregator sub-system in accordance with at least one embodiment.

As noted above, the computing resource monitoring service may include, within one or more datacenters, one or more partitioner sub-systems. A partitioner sub-system may include one or more computer systems that are collectively configured to publish measurements from customer computer systems to aggregator sub-systems for storage. Accordingly, FIG. 3 shows an illustrative example of an environment 300 in which a partitioner sub-system 302 of a computing resource monitoring service partitions measurements from various customer computer systems into various logical partitions and delivers measurements from each logical partition to one or more aggregator sub-systems 312 in accordance with at least one embodiment. The partitioner sub-system 302 may include a metric ingestion engine 304, which may be a module of the one or more computer systems of the partitioner sub-system 302 that is configured to obtain serialized measurements from the front-end server.

The metric ingestion engine 304 may access the metric mapping registry 310 to determine a method for partitioning the obtained measurements from the front-end server into one or more logical partitions for storage in one or more aggregator sub-systems 312. For instance, the metric ingestion engine 304 may utilize the metric mapping registry 310 to obtain a mapping of logical partitions to aggregator sub-systems 312 for a particular retention period. The metric ingestion engine 304 may partition the received measurements into one or more logical partitions based at least in part on the received FQMI for each measurement, the timestamp of each measurement, and the number of aggregator sub-systems 312 as defined by the metric mapping registry 310 through the mapping.

The FQMI, as noted above, may be a hash of the metadata for a measurement. A portion of the FQMI may be used to determine the logical partition for the associated metric, while another portion of the FQMI may be used for identification of the measurement within a logical partition. The partitioning of the measurements may be performed with consistent hashing to minimize the amount of measurements that are transmitted between aggregator sub-systems 312 as an aggregator sub-system 312 is added or removed from the particular datacenter. The partitioning of the measurements may also be based at least in part on the measurement timestamp for each measurement to eliminate any impact due to clock skew.

Once the metric ingestion engine 304 has partitioned the obtained measurements into one or more logical partitions based at least in part on the mapping from the metric mapping registry 310, the metric ingestion engine 304 may place the measurements from the one or more logical partitions into one or more file-based queues 308. Each file-based queue 308 may be bound to a single aggregator sub-system 312, as illustrated in FIG. 3. This binding of the file-based queue 308 to a particular aggregator sub-system 312 may be based at least in part on the logical partition associated with the file-based queue 308, as each logical partition may be mapped to a particular aggregator sub-system 312 based at least in part on the mapping. The measurements in each file-based queue 308 may be batched and delivered asynchronously to each aggregator sub-system 312 at regular time intervals (e.g., every few milliseconds, every few seconds, etc.) based at least in part on the time series of the measurements.

Within each file-based queue 308, the measurements may be further sub-partitioned based at least in part on the timestamp for each measurement. This may enable the partitioner sub-system 302 to prioritize delivery of the measurements such that the most recent measurements are delivered to the aggregator sub-systems 312 first. In an embodiment, if a file-based queue 308 reaches capacity, the partitioner sub-system 302 identifies the measurements with the oldest timestamp and purges these measurements from the queue 308. Further, any measurements with timestamps earlier than the oldest retention period may also be purged from the partitioner sub-system 302. This may enable the metric ingestion engine 304 to continuously populate the file-based queues 308 with new measurements obtained from the front-end server, which may have obtained the measurements from the customer computer systems.

The partitioner sub-system 302 may further include a future observation queue 306, which may be a separate unpartitioned queue not associated with any aggregated sub-systems 312. The metric ingestion engine 304 may transfer any measurements with timestamps in the future (e.g., measurements with timestamps later than the newest retention period) to the future observation queue 306 as the metric mapping registry 310 may not include a mapping of logical partitions to the aggregator sub-systems 312 for a retention period that would include these measurements. Thus, the metric ingestion engine 304 may only process measurements in the future observation queue 306 if the timestamps for these measurements become current and a mapping is available for storing the measurements in a logical partition and transmitting the measurements from the logical partition to the corresponding aggregator sub-system 312.

Figure 4:
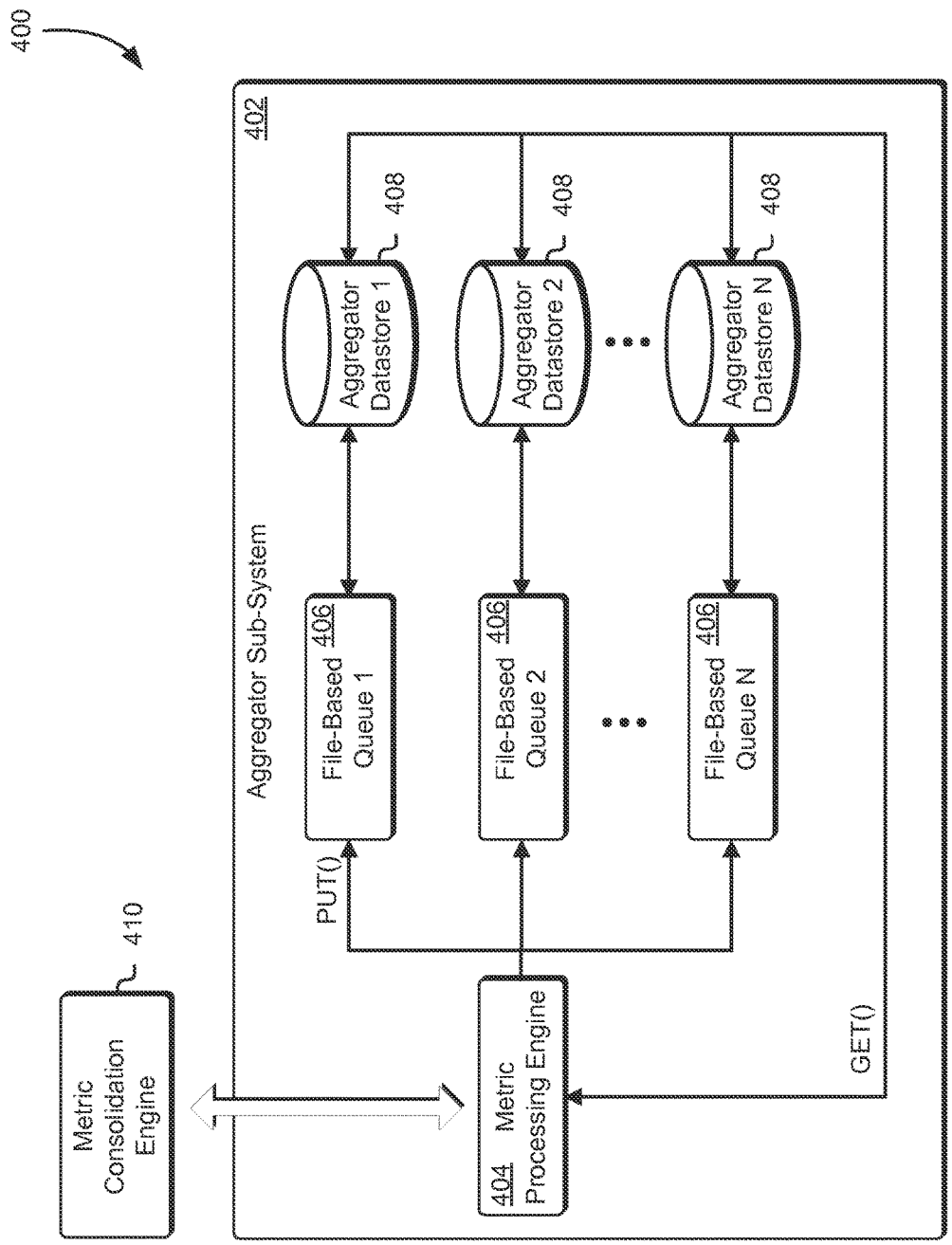
FIG. 4 shows an illustrative example of an environment in which an aggregator sub-system performs aggregation of measurements and provides read access for measurements stored within one or more datastores in accordance with at least one embodiment.

As noted above, the computing resource monitoring service may include, within each datacenter, one or more aggregator sub-systems configured to aggregate metric measurements in real time and to serve time series measurements for a variety of metrics. An aggregator sub-system may include one or more computer systems collectively configured to perform the aforementioned tasks, storing measurements within one or more aggregator datastores and making these measurements available for fulfillment of GET requests from customer computer systems and other entities. Accordingly, FIG. 4 shows an illustrative example of an environment 400 in which an aggregator sub-system 402 performs aggregation of measurements and provides read access for measurements stored within one or more datastores 408 in accordance with at least one embodiment. In the environment 400, the aggregator sub-system 402 may include a metric processing engine 404, which may comprise a module operating within the one or more computer systems of the aggregator sub-system 402. The metric processing engine 404 may receive the measurements from the logical partitions of the various partitioner sub-systems for storage in one or more datastores 408. In response to the PUT requests, the metric processing engine 404 may place the received one or more measurements into file-based queues 406 for asynchronous processing by a dedicated aggregator datastore 408.

Each aggregator datastore 408 may comprise one or more storage devices and at least one module configured to obtain measurements from a file-based queue 406 to store the measurements within the one or more storage devices. In an embodiment, the aggregator datastore 408 obtains a measurement from the file-based queue 406 and determines whether measurements for the same metric over the same aggregation period are stored within the aggregator datastore 408. If so, the aggregator datastore 408 may de-serialize the stored measurements and the measurement from the queue 404 in order to aggregate the measurements for the particular metric. The aggregator datastore 408 may obtain the results of the aggregation of the two sets of measurements and serialize the aggregated measurements using the binary serialization format described above. Once the aggregated measurements have been serialized, the aggregator datastore 408 may store these measurements within the one or more storage devices of the datastore 408 and transmit a notification to the metric processing engine 404 that the latest measurement has been stored successfully. Alternatively, if it is the first time that a measurement has been observed in an aggregation period, the measurement may simply be stored within the aggregator datastore 408 without need for de-serialization, as the measurement may already be in the binary serialization format. Once the metric processing engine 404 receives confirmation that a measurement has been stored successfully within an aggregator datastore 408, the metric processing engine 404 may access the metric mapping registry 410 to modify an entry within the mapping to specify that storage of the measurement within the aggregator sub-system 402 has been completed successfully.

The metric processing engine 404 may be configured to also process GET requests from a metric consolidation engine 410 of the computing resource monitoring service. As noted above, the metric mapping registry may include a mapping of logical partitions and measurements to aggregator sub-systems 402 within each datacenter. The metric consolidation engine may utilize this mapping to identify the aggregator sub-systems 402 that have the requisite measurements to fulfill the GET request from a customer computer system. Based at least in part on the mapping, the metric consolidation engine may transmit a request to the metric processing engine 404 of each of these identified one or more aggregator sub-systems 402 to obtain the needed measurements.

Once the metric processing engine 404 receives the GET request from the metric consolidation engine, the metric processing engine 404 may determine which aggregator datastores 408 have the necessary measurements to fulfill the request. The metric processing engine 404 may transmit a query including the FQMI and time range to each aggregator datastore 408. Each aggregator datastore 408 may utilize the provided information to identify any measurements that may be used to fulfill the request. If one or more measurements are identified, the aggregator datastore 408 may provide these measurements to the metric processing engine 404. The metric processing engine 404 may compile the measurements that may be used to fulfill the GET request and provide the compiled measurements to the metric consolidation engine 410 for further processing.

In an embodiment, the aggregator datastores 408 are configured to purge expired measurements from the one or more storage devices once the oldest retention period has been replaced by a later retention period. For instance, the computing resource monitoring service may serve GET requests for one or more consecutive retention periods. As a new retention period begins, the computing resource monitoring service may maintain a number of consecutive retention periods for fulfillment of GET requests from customer computer systems or other computing resources. The computing resource monitoring service may also maintain measurements for an older retention period that has become eligible for expiry but may not yet have been purged. When measurements for this older retention period have become eligible for expiry, the aggregator datastores 408 may purge any measurements with a timestamp that is within this older retention period.

Figure 5:
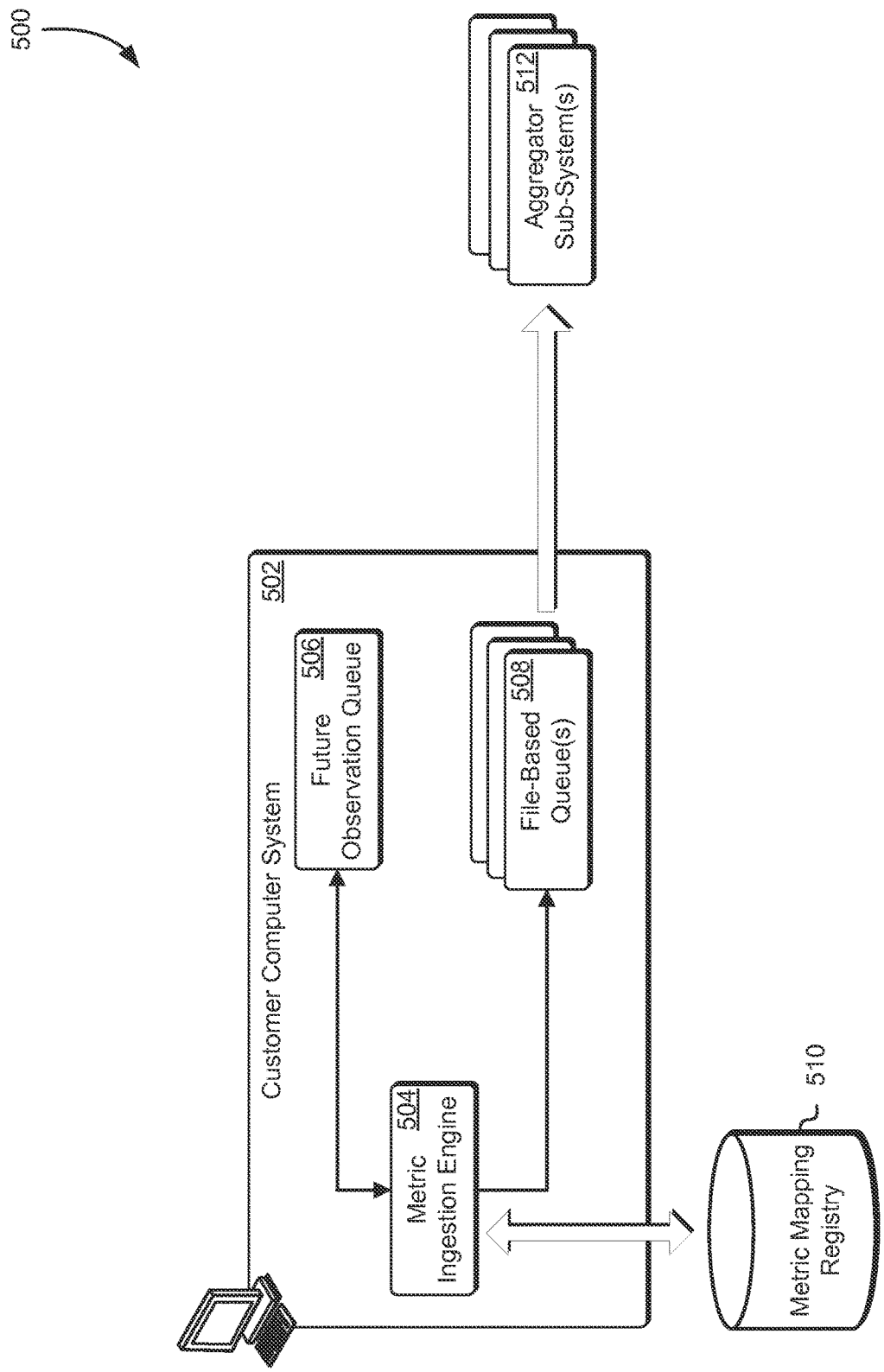
FIG. 5 shows an illustrative example of an environment in which a customer computer system partitions measurements into various logical partitions and delivers the measurements from each logical partition to one or more aggregator sub-systems of a computing resource monitoring service in accordance with at least one embodiment.

As noted above, the customer computer system may internally perform the partitioning of the measurements prior to aggregation and storage through use of one or more aggregator sub-systems within the computing resource monitoring service. This architecture may obviate the need for the computing resource monitoring service to maintain the one or more partitioner sub-systems described above in connection with FIGS. 2 and 3, as the computing resource monitoring service may obtain the serialized measurements directly from the logical partitions of the customer computer system. Accordingly, FIG. 5 shows an illustrative example of an environment 500 in which a customer computer system 502 partitions measurements into various logical partitions and delivers these measurements to one or more aggregator sub-systems 512 of a computing resource monitoring service in accordance with at least one embodiment.

In the environment 500, the customer computer system 502 may include a metric ingestion engine 504, which may be a module of the customer computer system 502 that is configured to obtain measurements from computing resources associated with the customer computer system 502 or from the customer computer system 502 itself. The metric ingestion engine 504 may perform similar operations as the metric ingestion engine described above in connection with FIG. 3. For instance, the metric ingestion engine 504 may access the metric mapping registry 510 within the computing resource monitoring service to determine a method for partitioning the obtained measurements into one or more logical partitions for storage in one or more aggregator sub-systems 512. The metric ingestion engine 504 may partition the received measurements into one or more logical partitions based at least in part on the received FQMI for each measurement, the timestamp of each measurement, and the number of aggregator sub-systems 512 as defined by the metric mapping registry 510 through the mapping. As opposed to the process described above in connection with FIG. 2, the customer computer system 502 may obtain the metadata for each measurement and utilize a hash function to generate an FQMI for the measurement. Additionally, the customer computer system 502 may transform the measurements into a serialized format for processing by the metric ingestion engine 504. The serialized format for a particular measurement obtained from the customer computer system 502 may include the FQMI, the timestamp for the measurement, the unit of measurement for the observation, and the measurement itself.

Once the metric ingestion engine 504 has partitioned the measurements into one or more logical partitions based at least in part on the mapping from the metric mapping registry 510, the metric ingestion engine 504 may place the one or more measurements from each logical partition into a corresponding file-based queue 508. Similar to the file-based queues illustrated in FIG. 3, each file-based queue 508 may be bound to a single aggregator sub-system 512. The measurements in each file-based queue 508 may be batched and delivered asynchronously to each aggregator sub-system 512 at regular time intervals (e.g., every few milliseconds, every few seconds, etc.) based at least in part on the time series of the measurements. For instance, at each time interval, the customer computer system 502 may transmit a PUT request that includes the measurements to one or more aggregator sub-systems 512 selected based at least in part on the mapping. The PUT request may be transmitted to these aggregator sub-systems 512 using a communications protocol compatible for both the customer computer system 502 and the aggregator sub-systems 512. If a PUT request is unsuccessful, the communications protocol may cause a notification to be generated specifying that the transmission of the measurements within the logical partition has failed. Further, the communications protocol may cause the customer computer system 502 to refresh the communications channel between the customer computer system 502 and the aggregator sub-systems 512. This may enable the customer computer system 502 to again attempt transmission of the PUT request to the aggregator sub-systems 512.

Within each file-based queue 508, the measurements may be further sub-partitioned based at least in part on the measurement timestamps. This may enable the customer computer system 502 to prioritize delivery of the measurements such that the most recent measurements are delivered to the aggregator sub-systems 512 first. Any measurements with timestamps earlier than the oldest retention period may be purged from the customer computer system 502 or delivered to an alternative metric monitoring service. This may enable the metric ingestion engine 504 to continuously populate the file-based queues 508 with new measurements generated or obtained by the customer computer system 502.

Similar to the partitioner sub-system illustrated in FIG. 3, the customer computer system 502 may further include a future observation queue 506, which may be a separate unpartitioned queue not associated with any aggregated sub-systems 512. The metric ingestion engine 504 may transfer any measurements with timestamps in the future (e.g., measurements with timestamps later than the newest retention period) to the future observation queue 506 as the metric mapping registry 510 may not include a mapping of logical partitions to the aggregator sub-systems 512 for a retention period that would include measurements with these timestamps. Thus, the metric ingestion engine 504 may only process measurements in the future observation queue 506 if the timestamps for these measurements become current and a mapping is available for generating a logical partition for these measurements and transmitting the measurements from the logical partition to the corresponding aggregator sub-system 512.

In an alternative embodiment, the metric ingestion engine 504 can provide unpartitioned measurements to the any number of aggregator sub-systems 512 of the computing resource monitoring service. The one or more aggregator sub-systems 512, upon obtaining the unpartitioned measurements, may access the metric mapping registry 510 to determine, based at least in part on the FQMI and timestamps for the measurements, which aggregator sub-systems 512 are to be used for storing the unpartitioned measurements. If an aggregator sub-system 512 determines, based at least in part on one or more mappings from the metric mapping registry 510, that unpartitioned measurements are to be stored within an in-memory datastore of another aggregator sub-system, the aggregator sub-system may transmit these unpartitioned measurements to the other aggregator sub-system, which may then store the measurements within its one or more in-memory datastores.

Figure 6:
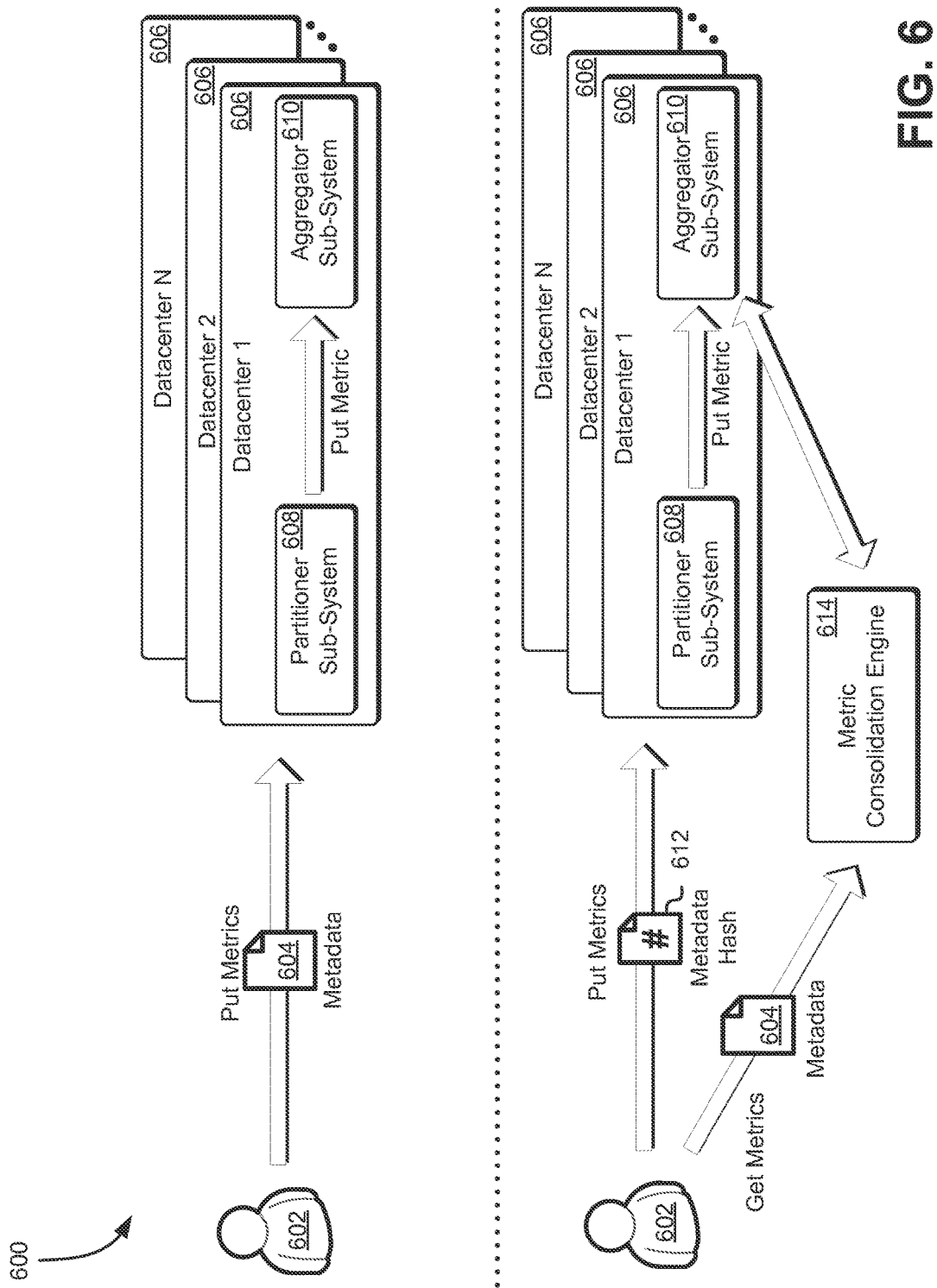
FIG. 6 shows an illustrative example of an environment in which metadata is provided with a measurement for a metric to enable future storage of measurements for the metric without requiring additional metadata transmissions in accordance with at least one embodiment.

FIG. 6 shows an illustrative example of an environment 600 in which metadata is provided with a measurement to enable future storage of measurements without requiring additional metadata transmissions in accordance with at least one embodiment. In the environment 600, a customer computer system 602 may transmit a PUT request to a computing resource monitoring service to store a measurement for a particular metric within aggregator sub-systems 610 of one or more datacenters 606. The PUT request may include, in addition to the measurement that is to be stored, metadata 604 for the measurement. This metadata 604 may include one or more metric attributes that may uniquely identify the associated measurement within the computing resource monitoring service. For instance, the metadata 604 may specify, individually or in combination, the account number of a customer associated with the customer computer system 602 submitting the PUT request or with another computing resource responsible for generation of the measurement, the name of the particular service responsible for managing the computing resource (e.g., virtual computer system service, database service, etc.), the dimensions for the measurement (e.g., key/value pairs), and an identifier for the computing resource producing the measurement.

When the computing resource monitoring service receives the measurement and metadata 604 from the customer computer system 602, the computing resource monitoring service may utilize a hash function to generate a hash of the metadata 604, which can be used as an FQMI for the measurement that is to be stored. Further, the computing resource monitoring service may utilize a binary serialization format to compress the measurement to be stored. In this binary serialization format, the serialized measurement may include the FQMI generated by hashing the metadata 604, the timestamp for the measurement, the unit of measurement for the measurement, and the measurement itself. Once the computing resource monitoring service has transformed the measurement into a serialized format, the computing resource monitoring service may transmit the measurement to a partitioner sub-system 608 within each datacenter 606. The partitioner sub-system 608 may determine a logical partition from a plurality of logical partitions for storage of the measurement based at least in part on the FQMI and timestamp of the received measurement, as well as the number of active aggregator sub-systems 610 within the particular datacenter 606 for one or more retention periods, as specified in the mapping of logical partitions to aggregator sub-systems 610. The partitioner sub-system 608 may transmit the measurement from a queue associated with the logical partition to the aggregator sub-systems 610 within the datacenter 606 according to a mapping of the logical partitions to the aggregator sub-systems 610 obtained from a metric mapping registry.

In an embodiment, once the computing resource monitoring service has hashed the metadata 604 to generate the FQMI for the measurement to be stored, the customer computer system 602 is no longer required to repeat the metadata 604 for future submissions of measurements for the metric, so long as the metadata 604 has not expired or the customer computer system 602 has not initiated a new session with the computing resource monitoring service. For instance, if the customer computer system 602 submits an additional PUT request at a later time to the computing resource monitoring service, the customer computer service 602 may provide the FQMI (e.g., metadata hash 612) for the measurement corresponding to the same metric instead of the metadata 604. The computing resource monitoring service may serialize the measurement and the FQMI in anticipation of storage of the measurement within the datastores of the computing resource monitoring service. Alternatively, if the customer computer system 602 does not provide the FQMI with the measurement, the computing resource monitoring service may identify, based at least in part on the measurement and the metric, the FQMI that is to be utilized based at least in part on metric entries within the metric mapping registry. For instance, if the PUT request includes a continuation of measurements for a particular time series, the computing resource monitoring service may determine the FQMI based at least in part on previously obtained measurements for the time series. These previously obtained measurements may have been obtained through an earlier PUT request to the computing resource monitoring service to store the measurements. This earlier PUT request may have included the metadata 604, from which the FQMI was generated.

At any time, the customer computer system 602 may submit a GET request to retrieve measurements from one or more aggregator sub-systems 610 of the computing resource monitoring service. The GET request may include the metadata 604 for the measurements that are to be obtained. The computing resource monitoring service may hash the received metadata 604 to generate an FQMI that can be used to locate the measurements being sought. The computing resource monitoring service may transmit a query, along with the FQMI, to the metric consolidation engine 614 in order to obtain the measurements required to fulfill the GET request. In response to the query, the metric consolidation engine 614 may access the metric mapping registry to determine where the measurements needed to fulfill the GET request are stored. The metric consolidation engine 614 may access the metric mapping registry and utilize the FQMI and timestamps for the measurements to determine which aggregator sub-systems 610 have the data necessary to fulfill the GET request. Once the metric consolidation engine 614 determines, based at least in part on the information provided by the metric mapping registry, the aggregator datastores from the aggregator sub-systems 610 where the measurements are stored, the metric consolidation engine 614 may access the aggregator datastores within each datacenter 606 to obtain the requested measurements.

Figure 7:
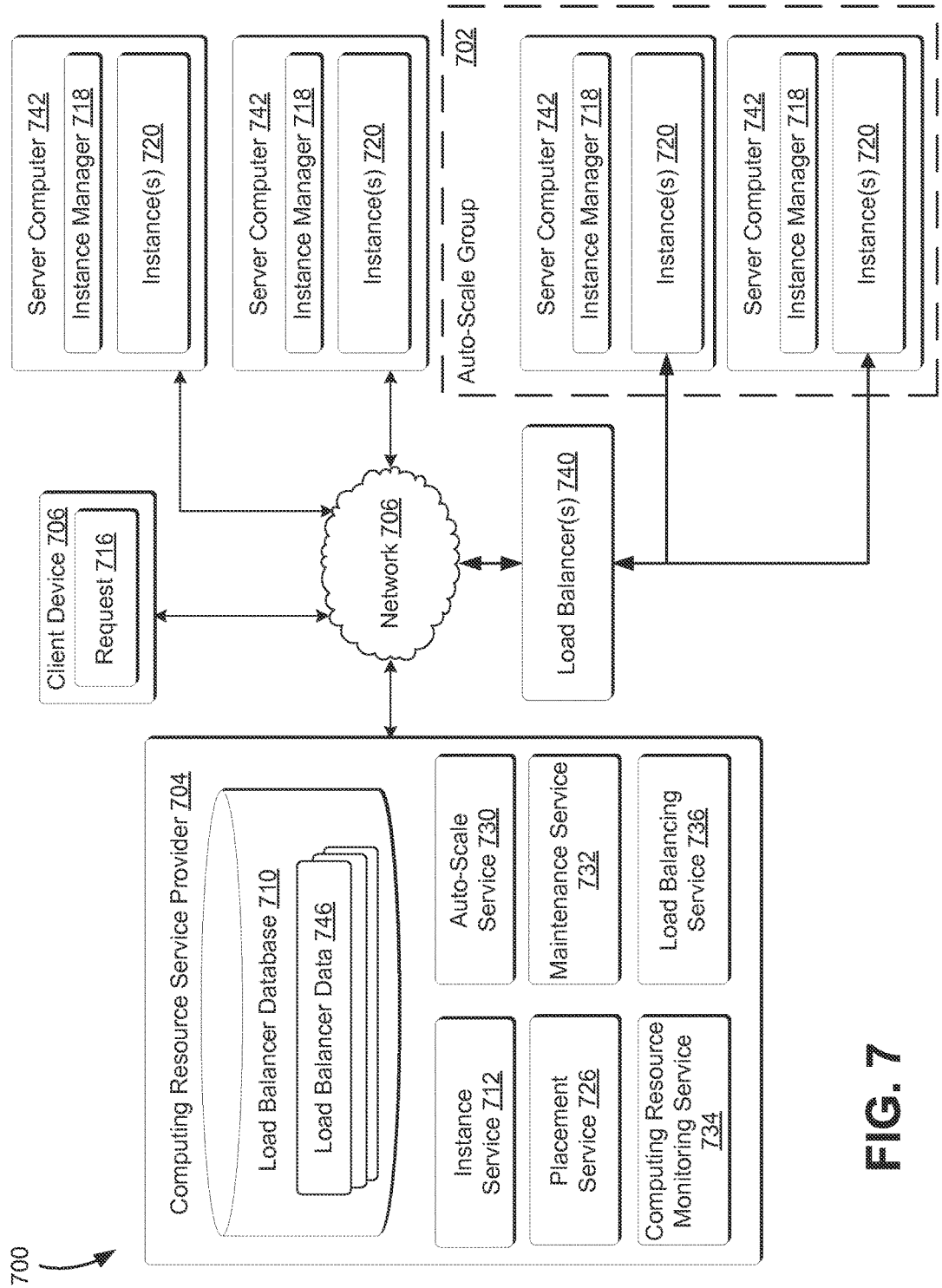
FIG. 7 shows an illustrative example of an environment in which ingestion of measurements for metrics are used to determine whether automatic scaling of one or more resources is to be performed in accordance with at least one embodiment.

As noted above, the computing resource monitoring service may make available measurements to one or more computing resource managers of an auto-scale group to enable these computing resource managers to quickly determine whether additional computing resources are necessary within the auto-scale group based at least in part on the obtained measurements. Accordingly, FIG. 7 shows an illustrative example of an environment 700 in which ingestion of measurements is used to determine whether automatic scaling of one or more resources is to be performed in accordance with at least one embodiment. In this example, the networked environment 700 includes a computing resource service provider 704 in data communication with a client device 706 and server computers 742 over a network 706. In one embodiment, the server computers 742 comprise one or more computer hardware devices that are used to implement instances 720 (e.g., computing resources). For example, the server computers 742 may include hardware for implementing types of computing resources, such as storage devices, virtualized storage devices, networking devices, and the like. Additionally, the implemented computing resources may be programmatically and remotely managed by a customer of the distributed computing resource service provider 704.

The server computers 742 include a plurality of computer system devices that are each capable of executing one or more instances 720 created by the computing resource service provider 704. In one embodiment, each of the server computers 742 includes a processor, a data store, an input/output bus, and/or any other component known in the art for executing instances 720. Additionally, the instances 720 may be virtual machine instances. As known in the art, a virtual machine instance is an instance of a software implementation on a machine (i.e., a computer) that executes programs like a physical machine. For example, each of the server computers 742 may be configured to execute an instance manager 718 capable of implementing the instances 720. For example, the instance manager 718 may be a hypervisor, virtualization layer, or another type of program configured to enable the execution of multiple instances 720 on a single server computer 742. As discussed above, each of the instances 720 may be configured to execute all or a portion of an application. The networked environment 700 may span one or more datacenters, where each datacenter may be geographically distinct from each other. Additionally, the networked environment 700 shown in FIG. 7 may be one of several embodiments employed by the computing resource service provider 704.

In one embodiment, the computing resource service provider 704 includes a load balancer database 710, an instance service 712, a placement service 726, an auto-scale service 730, a maintenance service 732, a computing resource monitoring service 734, a load balancing service 736, and/or other components. The load balancer database 710 may include load balancer data 742. For example, the load balancer database 710 may include one or more records of load balancers 740 associated with the auto-scale group 702. Each one of the records of the load balancer data 746 may correspond to a load balancer 740 of the networked environment 700.

The instance service 712 instantiates instances 720 based at least in part on a set of preferences provided by the customer. In one embodiment, the instance service 712 receives, from the customer on the client device 706, a request 716 to create one or more instances 732 and optionally assign the created instances 720 to an auto-scale group 702. Additionally, the request 716 received from the customer on the client device 706 may also indicate a time to start execution of the requested instances 720. In response to receiving the request, the instance service 712 instantiates instances 720. In various embodiments, the auto-scale service 730 receives the request and transmits a command to the instance service 712 to instantiate the instances 720 such that the instances are associated with the auto-scale group, for example, by associating auto-scale group 702 metadata with the instances 720. In one embodiment, the instance service 712 may place instances in standby or detach instances from the auto-scale group in response to a request from the client device 706 and/or auto-scale service 730. For example, the auto-scale service 730 may transmit a request to the instance service 712 to remove the auto-scale group 702 metadata associated with the instances 720 being detached from the auto-scale group 702 according to the request 716. Furthermore, the auto-scale service 730 may de-assign a detached instance from the load balancer 740.

The customer may interact with the computing resource service provider 704 (via appropriately configured and authenticated API calls) to provision, operate, and manage instances 720 associated with the auto-scale group 702 that is instantiated on server computers 742 and operated by the computing resource service provider 704. Additionally, the customer may create one or more auto-scale groups 702, and the auto-scale groups 702 may be a logical collection of instances 720. Furthermore, the instances 720 may be assigned to the auto-scale group 702 or may be members of the auto-scale group 702. The auto-scale service 730 may allow customers to interact with and manage various auto-scale groups 702. For example, the customer may, through the auto-scale service 730, set a maximum or minimum capacity for an auto-scale group 702. The auto-scale group 702 may then manage the instances 720 assigned to the auto-scale group in order to maintain the settings provided by the customer. In various embodiments, the customer can create and manage auto-scale groups 702 through a management console, as described above, provided by the computing resource service provider 704.

The management console may be exposed to the customers as a webpage; by interacting with the webpage (e.g., through a browser application) the customer may cause API calls to be generated. The generated API calls may cause the computing resource service provider 704 or component thereof to perform various operations indicated by the customer. Once the customer has created the auto-scale group 702, the customer may assign one or more load balancers to the auto-scale group 702 by submitting requests 716. The requests 716, in this case, may be processed by the auto-scale service 730 or other component of the computing resource service provider 304. The instances 720 of the auto-scale group 702 may be used for various purposes, such as to operate as servers supporting a website, to operate business applications, or generally, to serve as computing power for the customer. Other applications for the instances 720 may be to support database applications, electronic commerce applications, business applications and/or other applications. Additionally, load balancers 740 may distribute traffic to various instances 720 of the auto-scale group 702 to enable operation of the instances for the various purposes described above and prevent the instances 720 of the auto-scale group 702 from being overloaded. Although the instance service 712 is shown in FIG. 7, any other computer system or computer system service may be utilized by the computing resource service provider 702, such as a computer system or computer system service that does not employ virtualization or instantiation and instead provisions computing resources on dedicated or shared computers/servers and/or other physical devices.

The placement service 726 provisions the instances 720 to one or more of the server computers 742. In one embodiment, the placement service 726 determines the server computers 742 to provision the new instances 720 based at least in part on the indicated auto-scale group 702 of the new instances 720. For example, the placement service 726 may identify one or more server computers 742 with the appropriate capacity to execute the instances 720. To this end, the placement service 726 determines the capacity of each server computer 742 from the resource data 710 stored in the data store and accordingly provisions the instances 730, as will be described. The auto-scale service 730 automatically scales the capacity of a collection of previously requested instances 720 up or down based at least in part on circumstances defined by the customer that requested the instances 720. For example, the auto-scale service 730 may decrease the number of instances 720 allocated to the customer during demand lulls and increase the number of instances 720 allocated to the customer during demand peaks.

In one embodiment, the auto-scale service 730 sheds a subset of the requested instances 720 during a period of low usage and/or idle time. For example, the auto-scale service 730 may determine that the amount of instances 720 requested by the customer is redundant and/or excessive. In response, the auto-scale service 730 may terminate a certain number of instances 320 allocated to the customer such that the remaining number of instances 720 allocated to the customer is not redundant and/or excessive. In another embodiment, the auto-scale service 730 may shed the subset of the requested instances 730 if the usage rate does not exceed a predetermined threshold. Similarly, the auto-scale service 730 increases the amount of instances 320 during a period of high usage. In one embodiment, the auto-scale service 730 may increase the amount of instances 720 if the usage rate exceeds a predetermined threshold.

The maintenance service 732 schedules maintenance, software updates, and/or firmware updates for the server computers 742. In one embodiment, the maintenance service 732 schedules the maintenance and software updates at an appropriate time based at least in part on the available capacity of the server computers 742. For example, the maintenance service 732 may schedule the maintenance and software updates at a time when the respective server computer 742 has a projected availability. In one embodiment, the maintenance service 732 may patch and restart the server computers 742 when the maintenance service 732 determines that the server computer 742 is not hosting any instances 720. Additionally, the maintenance service 732 may patch virtual machines associated with the instance 742 if necessary prior to instantiating new images that are associated with the respective virtual machines. For example, the maintenance service 732 may schedule a patch of the machine image based at least in part on the health status of the instances 720. In one embodiment, no additional instances may be provisioned on the server computer 742 until the scheduled maintenance is completed.

The maintenance service 732 may also periodically or aperiodically check the health status of the instances 720, including instances assigned to the auto-scale group 702 and/or load balancers 740. The health check may include determining the load, utilization, and operation of various components of the instances 720 such as the central processing unit, memory, networking interface, operating system, application, and other components of the instances 720. In various embodiments, when the maintenance service 732 determines that an instance 720 is unhealthy, based at least in part on the health check, the maintenance service 732 or other component of the service provider 704, such as the auto-scale service 730, may initiate a workflow to remove the unhealthy instances from the auto-scale group 702. Additionally, if the maintenance service 732, determines that a previously unhealthy instance 720 has returned to a healthy status the maintenance service 732 or other component of the service provider 704, such as the auto-scale service 730, may move the instances 720 into service or attach the instances 720 to the auto-scale group 702. Furthermore, if an instance 722 assigned to a load balancer 740 returns a healthy status the auto-scale group 702 may update the status of the load balancer 740 to in-service, as described above.

The computing resource monitoring service 734 may be responsible for collecting resource data corresponding to the instances 720. The resource data obtained by the computing resource monitoring service 734 may indicate the utilization of various components of the instances 720 such as the central processing unit, memory, networking interface, operating system, applications, and other components of the instances 720. This information may be used for a variety of different purposes, for example, determining whether to allocate or deallocate resources to the auto-scale group 702. Additionally, the information may be used by the maintenance service 732 to determine the health of an instance 720 and/or a server computer 742. The computing resource monitoring service 734 may obtain and aggregate utilization information for all of the instances 720 assigned to the auto-scale group 702.

In an embodiment, the computing resource monitoring service 734 obtains, from the one or more load balancers 740 for the instances 720 of the auto-scale group 702, one or more PUT requests to store measurements for the one or more instances 720 within one or more in-memory datastores of the computing resource monitoring service 734. Each PUT request may include metadata for each measurement, specifying the metric attributes for the measurement. The computing resource monitoring service 734, through a front-end server, may obtain the measurement and the metadata from a load balancer 740. The front-end server may utilize the metadata and a hash function to generate an FQMI for the measurement that is to be stored within the aggregator datastore of the computing resource monitoring service 734. Additionally, the front-end server may transform the measurement into a serialized format for publication to a partitioner sub-system within the one or more datacenters of the service 734. The front-end server may transmit the serialized measurement from the instance 720 to a partitioner sub-system.

The partitioner sub-system may determine, based at least in part on the FQMI and the timestamp for the measurement, which logical partition of a plurality of logical partitions will be used for storing the measurement. The partitioner sub-system may access a metric mapping registry, which may provide a mapping of logical partitions to the aggregator sub-systems active for one or more retention periods. This may enable the partitioner sub-system to determine which aggregator sub-system of the computing resource monitoring service 734 the measurement will be stored in for the processing of GET requests. The partitioner sub-system may store the measurement within a file-based queue associated with the selected logical partition, bound to a single aggregator sub-system.

Once the aggregator sub-system of the computing resource monitoring service 734 obtains the measurement from the partitioner sub-system, the aggregator sub-system may determine whether measurements for the same metric over the same aggregation period are stored within an aggregator datastore. If so, the aggregator datastore may de-serialize the stored measurements and the measurement from the partitioner sub-system in order to aggregate the measurements for the particular metric. The aggregator datastore may obtain the results of the aggregation of the two sets of measurements and serialize the aggregated measurements using the binary serialization format described above.

Once the aggregated measurements have been serialized, the aggregator datastore may store these measurements within the one or more storage devices of the datastore and transmit a notification to the metric processing engine 404 that the latest measurement has been stored successfully. Alternatively, if it is the first time that a measurement has been observed in an aggregation period, the measurement may simply be stored within the aggregator datastore without need for de-serialization.

In an embodiment, the front-end server of the computing resource monitoring service 734 is further configured to provide measurements for various metrics to the one or more instance managers 718 of the auto-scale group 702 once the measurements have been aggregated, after a particular time period has passed, and/or in response to a triggering event, such as a spike in the measurements for a particular metric. The metric mapping registry may maintain one or more entries for the instances 720 of the auto-scale group 702, which may specify, for each retention period, the aggregator datastores within the various datacenters of the computing resource monitoring service 734 that include measurements for these instances 720. Additionally, the metric consolidation engine of the computing resource monitoring service 734 may be configured to periodically access the metric mapping registry to identify these aggregator datastores that include these measurements. This may enable the metric consolidation engine to obtain the measurements for these instances 720 and provide the measurements to the front-end server. The front-end server may transmit the measurements to the one or instance managers 718 of the auto-scale group 702 to enable the instance managers 718 to automatically scale the instances 720 accordingly. In some instances, the one or more instance managers 718 may instead transmit GET requests to the computing resource monitoring service 734, which may fulfill the GET request by performing the process described above to obtain the requested measurements for the one or more instances 720.

In an embodiment, when the one or more instance managers 718 of the auto-scale group 702 obtains the measurements from the front-end server, the one or more instance managers 718 can determine whether to perform modification of any of the one or more instances 720 of the auto-scale group 702. For instance, the one or more instance managers 718, based at least in part on the obtained measurements for a particular instance 720, may change the instance type to address any issues highlighted by the obtained measurements. For example, if the one or more instance managers 718 determine that based at least in part on the measurements a particular instance 720 requires additional processing power and memory, the one or more instance managers 718 may provision an instance that provides greater processing power and memory, thereby enabling the one or more instance managers 718 to transfer the instance assets from the original instance to this newly provisioned instance.

The one or more instance managers 718 may perform modification of the one or more instances 720 after evaluation of measurements over a particular period of time has passed. For instance, if the obtained measurements for a particular retention period are indicative of a need to automatically scale the auto-scale group 702 (e.g., add instances 720, remove instances 720, modify existing instances 720, etc.), the one or more instance managers 718 may await modification of the auto-scale group 702 until it obtains and evaluates measurements for additional retention periods. For example, if the measurements for subsequent retention periods indicate that there it is not necessary to perform any modifications of the auto-scale group 702, the one or more instance managers 718 may not perform these modifications, as the measurements indicative of a need to automatically scale the auto-scale group 702 may be deemed an aberration.

A load balancing service 736 may be offered to customers of a computing resource service provider 704 in order to facilitate request processing by instances 720 of the customer. In various embodiments, the instances 720 may be assigned to the auto-scale group 702 and the load-balancer service 736 may distribute traffic to the instances 722 assigned to the auto-scale group 702. For example, the customer may operate a website using instances 720 assigned to the auto-scale group 702 using the resources of computing resource service provider 704. Additionally, the website may receive requests from multiple other customers over the network 706. The computing resource service provider 704 may configure a load balancer of the load balancing service 736 to direct the requests to the instances 720 of the auto-scale group 702 executing the website, in such a way that the load generated by processing the requests is distributed among the instances 720 of the auto-scale group 702 executing the website. The load balancing service 736 may be a computer system or virtual computer system configured to distribute the request to the instances 720 assigned to the load balancer in order to optimize resource utilization and/or avoid overloading a particular server computer 742. For example, the load balancer may include physical hardware connected to a server rack or otherwise included in a data center. In another example, the load balancer may include one or more virtual machines supported by the server computer 742.

Figure 8:
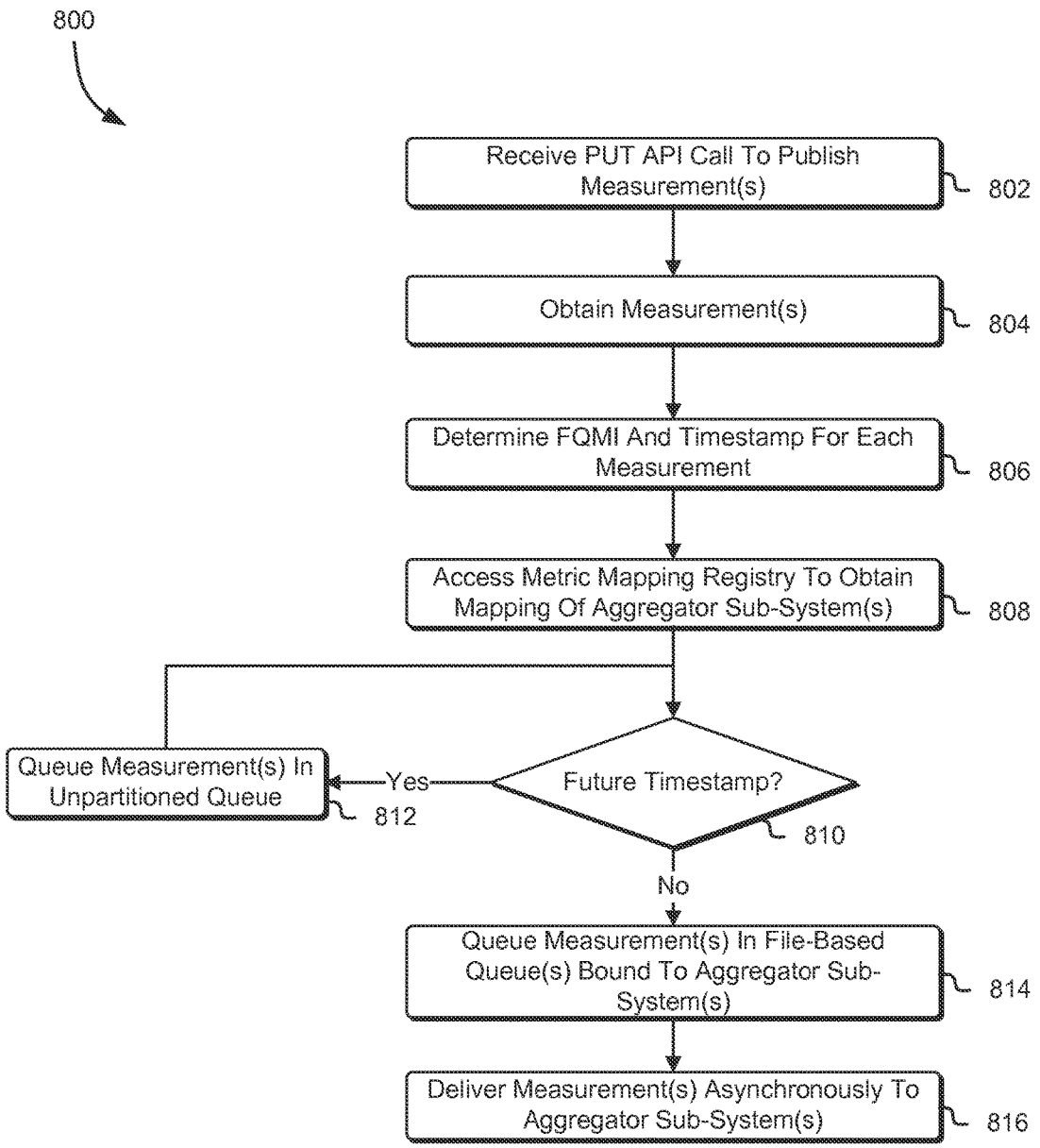
FIG. 8 shows an illustrative example of a process for partitioning measurements for a metric for delivery to one or more aggregator sub-systems in accordance with at least one embodiment.

As noted above, a computing resource monitoring service may include one or more partitioner sub-systems, which may serve as entry points for the publication of measurements for various metrics. The partitioner sub-systems may obtain measurements from a front-end server and split these measurements into logical partitions based at least in part an FQMI and the timestamp for each measurement and a number of aggregator sub-systems as provided by the metric mapping registry. The partitioner sub-systems may provide these measurements to the various aggregator sub-systems based at least in part on the mapping from the metric mapping registry. Accordingly, FIG. 8 shows an illustrative example of a process 800 for partitioning measurements for a metric for delivery to one or more aggregator sub-systems in accordance with at least one embodiment. The process 800 may be performed by a front-end server of the computing resource monitoring service, which may obtain measurements from various computing resources and/or customer computer systems and performed operations prior to providing the measurements to the aforementioned partitioner sub-system of the computing resource monitoring service, which may perform various operations of the process 800.

At any point, the front-end server may receive 802, from a customer computer system or other computing resource, a PUT API call to publish a measurement within an aggregator sub-system for in-memory storage of the measurement within an aggregator datastore. The PUT API call may include the measurement to be stored as well as metadata for the particular measurement. The metadata may specify one or more metric attributes for the measurement. For instance, the metadata may uniquely identify the measurement by a combination of a customer account number, the namespace (e.g., associated service for the computing resource), the dimensions for the measurement (e.g., key/value pairs), the name of the measurement itself, and the like. Thus, the front-end server may obtain 804, from the PUT API call, the measurement that is to be stored in-memory within an aggregator datastore of the computing resource monitoring service.

Once the front-end server has obtained the measurement from the PUT API call, the front-end server may utilize a hash function and the provided metadata to generate an FQMI for the measurement. This FQMI may include a multiple-byte hash, wherein a portion of the hash may be used to determine a logical partition for each measurement metric based at least in part on a mapping within a metric mapping registry, while another portion of the hash may be used for unique identification of the measurement once placed within the corresponding logical partition. The front-end server may further transform the measurement into a binary serialization format. The measurement, in this format, may include the FQMI, timestamp for the measurement, measurement unit for the measurement, and the measurement itself. The front-end server may transmit this serialized measurement to a partitioner sub-system within each datacenter of the computing resource monitoring service for redundant storage of the measurement. The partitioner sub-system within each datacenter may be selected through use of a partitioner load-balancer.

When the partitioner sub-system receives the serialized measurement from the front-end server, the partitioner sub-system may determine 806 the FQMI and timestamp for the measurement. The partitioner sub-system may access 808 the metric mapping registry to obtain a mapping of logical partitions to various aggregator sub-systems to determine which logical partition will be used for placement of the measurement and for delivery to an aggregator sub-system. For instance, the partitioner sub-system may utilize the FQMI and timestamp from the serialized measurement to identify, based at least in part on the mapping, which logical partition to place the measurement in.

In an embodiment, the partitioner sub-system utilizes the timestamp and the mapping to determine 810 whether the measurement is for a time period beyond the latest retention period, as specified in the mapping. If the measurement includes a future timestamp (e.g., timestamp is for a time beyond the latest retention period), the partitioner sub-system may queue 812 the measurement in a separate unpartitioned queue, where the measurement may remain until the timestamp for the measurement is covered by the present retention period at a later time. As the retention period is updated, the partitioner sub-system may obtain the measurement from this queue and determine whether the timestamp for the measurement is covered by the present retention period. If not, the measurement may remain in the queue.

If the timestamp for the measurement is for a current retention period, the partitioner sub-system may place the measurement within a logical partition of a plurality of logical partitions of the partitioner sub-system, as determined based at least in part on the timestamp, FQMI, and the mapping. Each logical partition may be associated with a particular queue, which may be used to transmit measurements from the partitioner sub-system to the corresponding aggregator sub-system, as determined through use of the mapping. Thus, when the measurement is placed in a logical partition, the partitioner sub-system may move 814 the measurement into an associated file-based queue bound to a corresponding aggregator sub-system. The measurements within this queue may be partitioned based at least in part on the timestamp for each measurement such that delivery of the most recent measurements may be completed first. Thus, based on this partitioning of the measurements, the partitioner sub-system may deliver 816 the measurement asynchronously from the queue to the corresponding aggregator sub-system for in-memory storage of the measurement.

Figure 9:
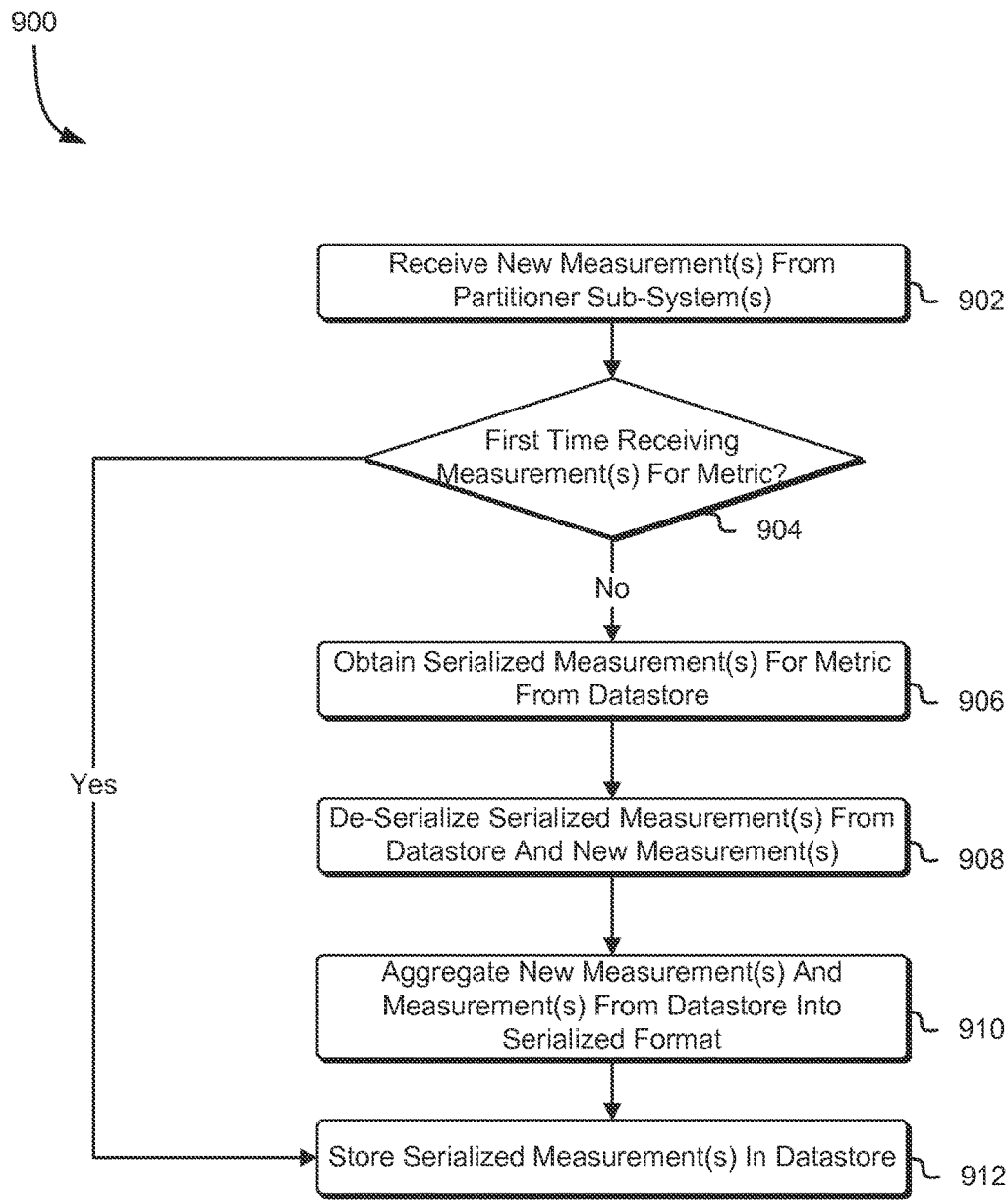
FIG. 9 shows an illustrative example of a process for aggregating measurements from one or more partitioner sub-systems with measurements from one or more datastores of a computing resource monitoring service in accordance with at least one embodiment.

As noted above, the partitioner sub-system may transmit serialized measurements to one or more aggregator sub-systems configured to aggregate metric measurements in real time and to serve time series measurements for a variety of metrics. An aggregator sub-system may include one or more computer systems collectively configured to perform the aforementioned tasks, storing measurements within one or more aggregator datastores and making these measurements available for fulfillment of GET requests from customer computer systems and other entities. Accordingly, FIG. 9 shows an illustrative example of a process 900 for aggregating measurements from one or more partitioner sub-systems with measurements from one or more datastores of a computing resource monitoring service in accordance with at least one embodiment. The process 900 may be performed by any aggregator sub-system of the computing resource monitoring service, which may be configured to process measurements from the partitioner sub-systems and store the measurements within one or more in-memory datastores.

At any point during a retention period, the aggregator sub-system may receive 902 a new serialized measurement from a partitioner sub-system. As described above in connection with FIG. 8, the partitioner sub-system may include one or more file-based queues, which may be configured to asynchronously transmit data to the one or more aggregator sub-systems within a datacenter. Each queue may be associated with a single aggregator sub-system based at least in part on a mapping for the given retention period included within the metrics mapping registry. Based at least in part on the FQMI and timestamp of the received measurement, the aggregator sub-system may identify a particular in-memory datastore for storage of the received measurement.

Once the aggregator sub-system has identified the in-memory datastore for storage of the obtained measurement, the aggregator sub-system may determine 904 whether it is the first time that the aggregator sub-system has encountered a measurement for the particular metric for an aggregation period. If this is the first time that the aggregator sub-system has observed a measurement for this metric during the aggregation period, the aggregator sub-system may store 912 the serialized measurement within the identified in-memory datastore. However, if the aggregator sub-system determines that other measurements for the metric over the aggregation period are stored within the identified in-memory datastore, the aggregator sub-system may obtain 906 these other serialized measurements from the in-memory datastore.

The aggregator sub-system may de-serialize 908 the newly obtained serialized measurement from the partitioner sub-system and the other serialized measurements from the in-memory datastore for aggregation of the measurements. Once the aggregator sub-system has de-serialized the newly obtained serialized measurement and the measurements from the in-memory datastore, the aggregator sub-system may aggregate 910 the newly obtained measurement from the partitioner sub-system with the other measurements for the metric previously stored within the in-memory datastore. This aggregation may include serializing the aggregated measurements into the binary serialization format described above. Once the aggregator sub-system has aggregated and serialized the measurements, the aggregator sub-system may store 912 the serialized measurements within the in-memory datastore.

Figure 10:
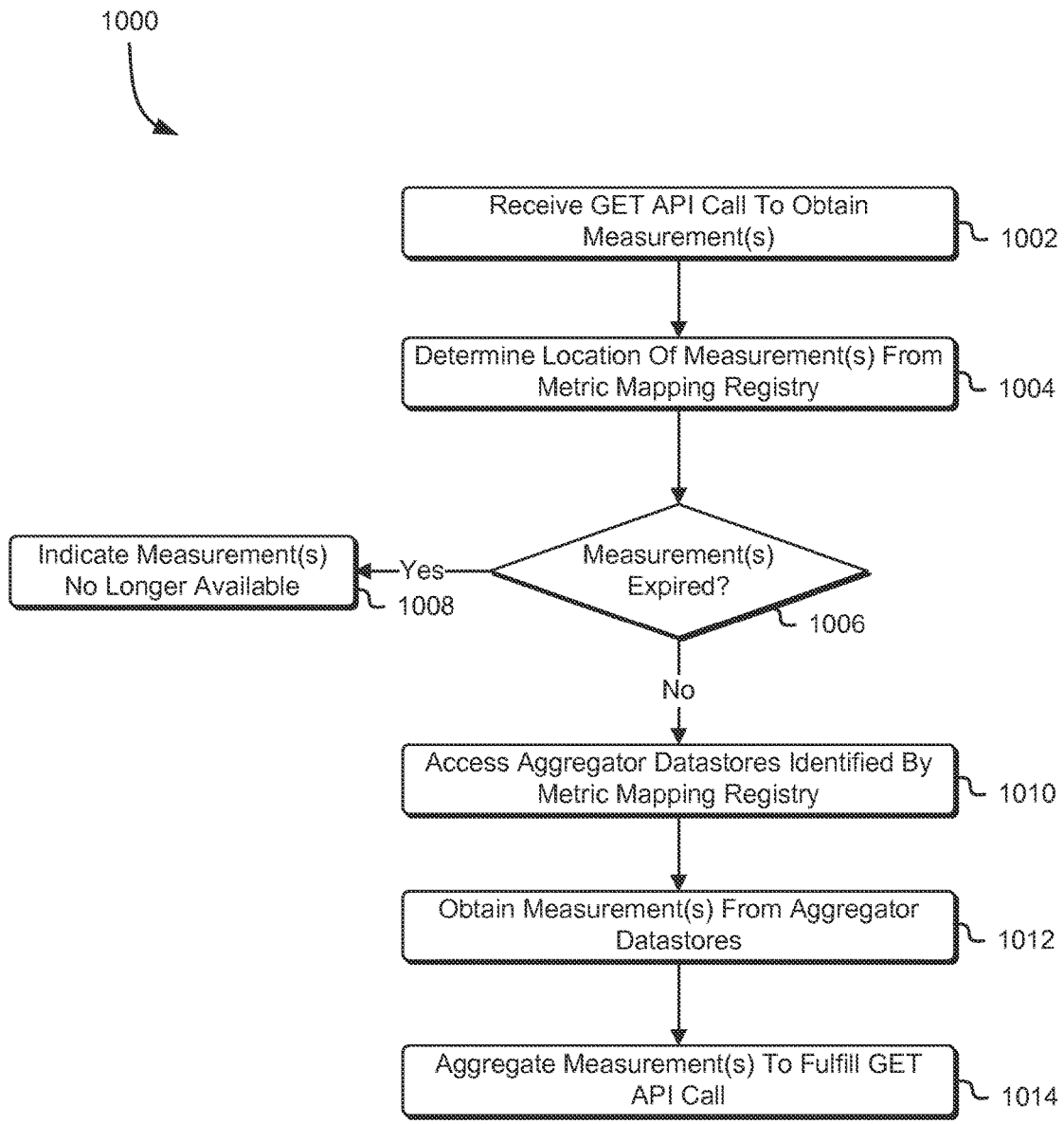
FIG. 10 shows an illustrative example of a process for retrieving one or more measurements from one or more aggregator datastores in response to a GET application programming interface call in accordance with at least one embodiment.

As noted above, the front-end server of a computing resource monitoring service, in conjunction with the metric consolidation engine of the service, may process and fulfill GET requests from customer computer systems and/or other computing resources. For instance, in response to a GET request, the metric consolidation engine may obtain measurements necessary to fulfill the request from one or more aggregator datastores as specified within the metric mapping registry and compile these measurements for delivery to the requesting entity. Accordingly, FIG. 10 shows an illustrative example of a process 1000 for retrieving one or more measurements from one or more aggregator datastores in response to a GET application programming interface call in accordance with at least one embodiment. The process 1000 may be performed by the front-end server, which may obtain the GET requests from various entities, and a metric consolidation engine, which may obtain the measurements and compile these measurements for delivery to the requesting entities.

At any point, a front-end server of the computing resource monitoring service may receive 1002 a GET API call to obtain one or more measurements from the computing resource monitoring service. The GET API call may include metadata for the measurements to be obtained. The front-end server may utilize a hash function and the metadata to generate one or more FQMIs for measurements to be obtained from one or more aggregator datastores of the computing resource monitoring service. The front-end server may access the metric mapping registry and utilize the one or more FQMIs to determine 1004 the location for each of the requested measurements.

Once the front-end server has obtained the location for each of the requested measurements, the front-end server may determine 1006 whether any of the requested measurements are no longer stored within the one or more aggregator datastores of the computing resource monitoring service due to expiration of the measurements. If it is determined that one or more measurements have expired, the front-end server may indicate 1008, to the requesting entity, that these one or more measurements are no longer available from the one or more aggregator datastores. If these expired measurements have been moved to an alternative datastore, such as an archival datastore, the front-end server may transmit a request to a computer system of the archival datastore to retrieve the expired measurements.

Once the front-end server has determined the location of any unexpired measurements within the one or more aggregator datastores, the front-end server may cause a metric consolidation engine to access 1010 the one or more aggregator datastores specified within the metric mapping registry to obtain 1012 the one or more measurements from the aggregator datastores, the measurements being necessary to fulfill the GET request. The metric consolidation engine may aggregate 1014 and compile the measurements from the one or more aggregator datastores and de-serialize the measurements in order to fulfill the GET request. In an embodiment, if the measurements are redundantly stored within more than one datacenter of the computing resource monitoring service, the metric consolidation obtains multiple responses to the GET request.

If the compiled measurements for the datacenters are inconsistent, the metric consolidation engine may utilize one or more conflict resolution rules to determine which measurements are to be provided in response to the GET request.

For instance, the metric consolidation engine may select the response with the highest sample count from the various datacenters. Once the metric consolidation engine has resolved any conflicts among the datacenters, if any, the metric consolidation engine may provide the measurements to the front-end server. This may enable the front-end server to fulfill the GET request by providing the measurements to the requesting entity.

Figure 11:
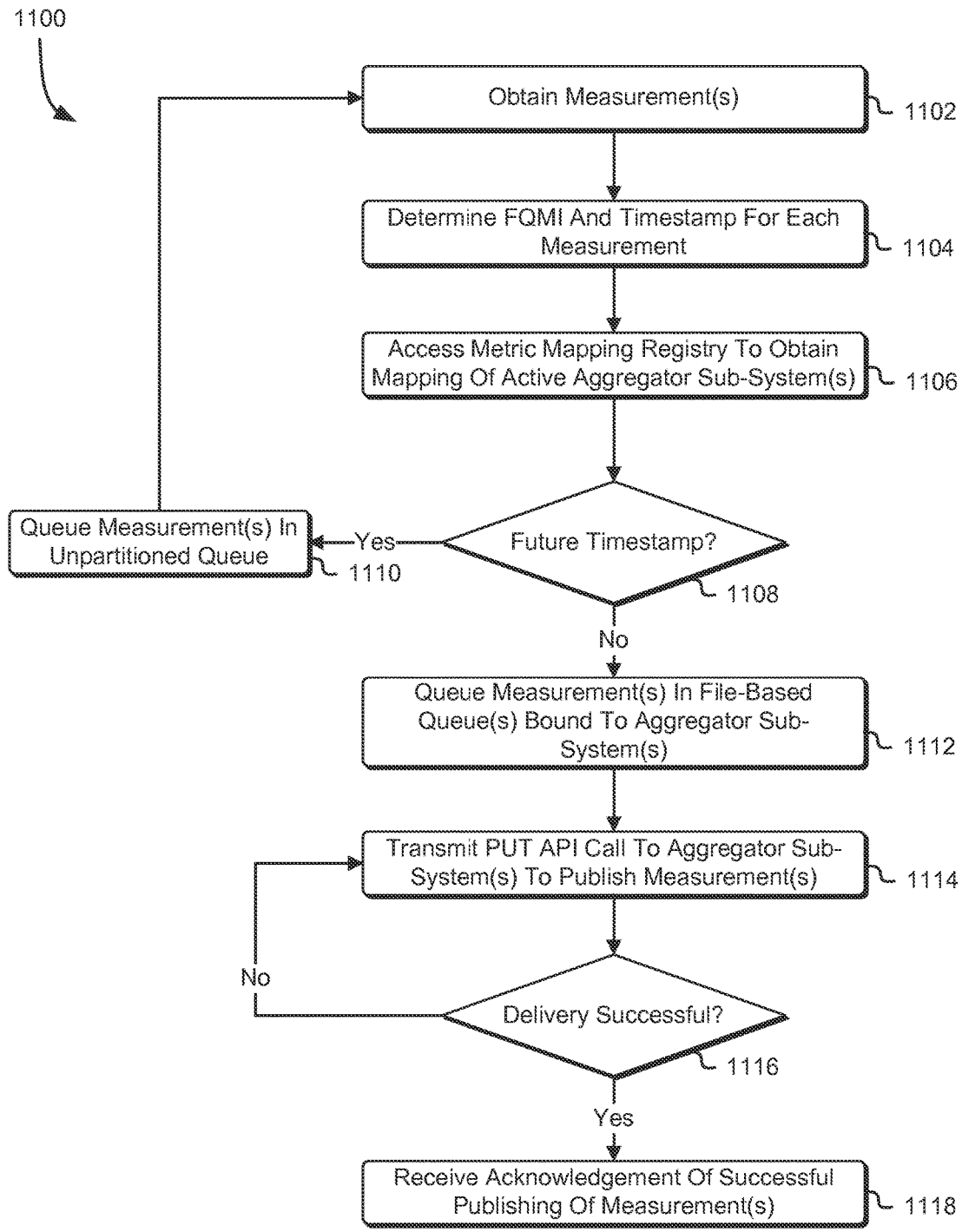
FIG. 11 shows an illustrative example of a process for partitioning measurements to be transmitted to a computing resource monitoring service for publishing of the measurements in accordance with at least one embodiment.

As noted above, the customer computer system or other computing resource providing measurements to the computing resource monitoring service may internally perform the partitioning of measurements prior to aggregation and storage through use of one or more aggregator sub-systems of the computing resource monitoring service. This architecture may obviate the need for the computing resource monitoring service to maintain the one or more partitioner sub-systems or load balancers for the partitioner sub-systems described above in connection with FIGS. 2 and 3, as the computing resource monitoring service may obtain the serialized measurements directly from the logical partitions of the customer computer system or other computing resource. Accordingly, FIG. 11 shows an illustrative example of a process 1100 for partitioning measurements to be transmitted to a computing resource monitoring service for publishing of the measurements in accordance with at least one embodiment. The process 1100 may be performed by a customer computer system or other computing resource, which may be configured to internally obtain and partition measurements for delivery to aggregator sub-systems of the computing resource monitoring service for in-memory storage.

The customer computer system or other computing resource may include one or more monitoring agents configured to monitor the health and other metrics for the customer computer system or computing resource. These monitoring agents may record various measurements for various metrics over time and provide these measurements to a front-end module of the customer computer system or computing resource. Thus, the customer computer system may obtain 1102 a measurement from a monitoring agent for storage within an in-memory datastore. Additionally, the customer computer system may obtain metadata associated with the obtained measurement. Similar to the process 800 described above, the customer computer system server may utilize a hash function and the provided metadata to determine 1104 the FQMI for the measurement. This FQMI may include a multiple-byte hash, wherein a portion of the hash may be used to determine a logical partition for each measurement metric based at least in part on a mapping within a metric mapping registry of the computing resource monitoring service, while another portion of the hash may be used for unique identification of the measurement once placed within the corresponding logical partition. The customer computer system may further transform the measurement into a binary serialization format.

The customer computer system may access 1106 the metric mapping registry of the computing resource monitoring service to obtain a mapping of logical partitions to aggregator sub-systems within the computing resource monitoring service. The customer computer system may utilize the mapping and the FQMI and timestamp of the measurement to identify active aggregator sub-systems for one or more retention periods. This may enable the customer computer system to associate each logical partition to a corresponding aggregator sub-system within the computing resource monitoring service.

In an embodiment, the customer computer system utilizes the timestamp and the mapping to determine 1108 whether the measurement is for a time period beyond the latest retention period, as specified in the mapping. If the measurement includes a future timestamp (e.g., timestamp is for a time beyond the latest retention period), the customer computer system may queue 1110 the measurement in a separate unpartitioned queue, where the measurement may remain until the timestamp for the measurement is covered by the present retention period at a later time. As the retention period is updated, the customer computer system may obtain the measurement from this queue and determine whether the timestamp for the measurement is covered by the present retention period. If not, the measurement may remain in the queue.

If the timestamp for the measurement is for a current retention period, the customer computer system may place the measurement within a logical partition of a plurality of logical partitions of the partitioner sub-system, as determined based at least in part on the timestamp, FQMI, and the mapping. Each logical partition may be associated with a particular queue, as described above. Thus, when the measurement is placed in a logical partition, the customer computer system may queue 1112 the measurement within an associated file-based queue bound to a corresponding aggregator sub-system. The measurements within this queue may be partitioned based at least in part on the timestamp for each measurement such that delivery of the most recent measurements may be completed first. Thus, based on this partitioning of the measurements, the customer computer system may transmit 1114 one or more PUT API calls including the measurement to the corresponding aggregator sub-system within the computing resource monitoring service.

In an embodiment, the PUT API calls to the aggregator sub-system are transmitted through use of a communications protocol which may indicate whether delivery of the PUT API call was completed successfully or not. Thus, through use of this protocol, the customer computer system may determine 1106 whether delivery of the PUT API calls and, hence, the measurements was successful. If delivery of the measurements is unsuccessful, the customer computer system may refresh the communications channel between the customer computer system and the aggregator sub-system and transmit 1114 the one or more PUT API calls including the measurement to the corresponding aggregator sub-system within the computing resource monitoring service. Otherwise, if delivery was successful, the customer computer system may receive 1116 acknowledgement of successful delivery and aggregation of the measurements within the aggregator sub-system.

Figure 12:
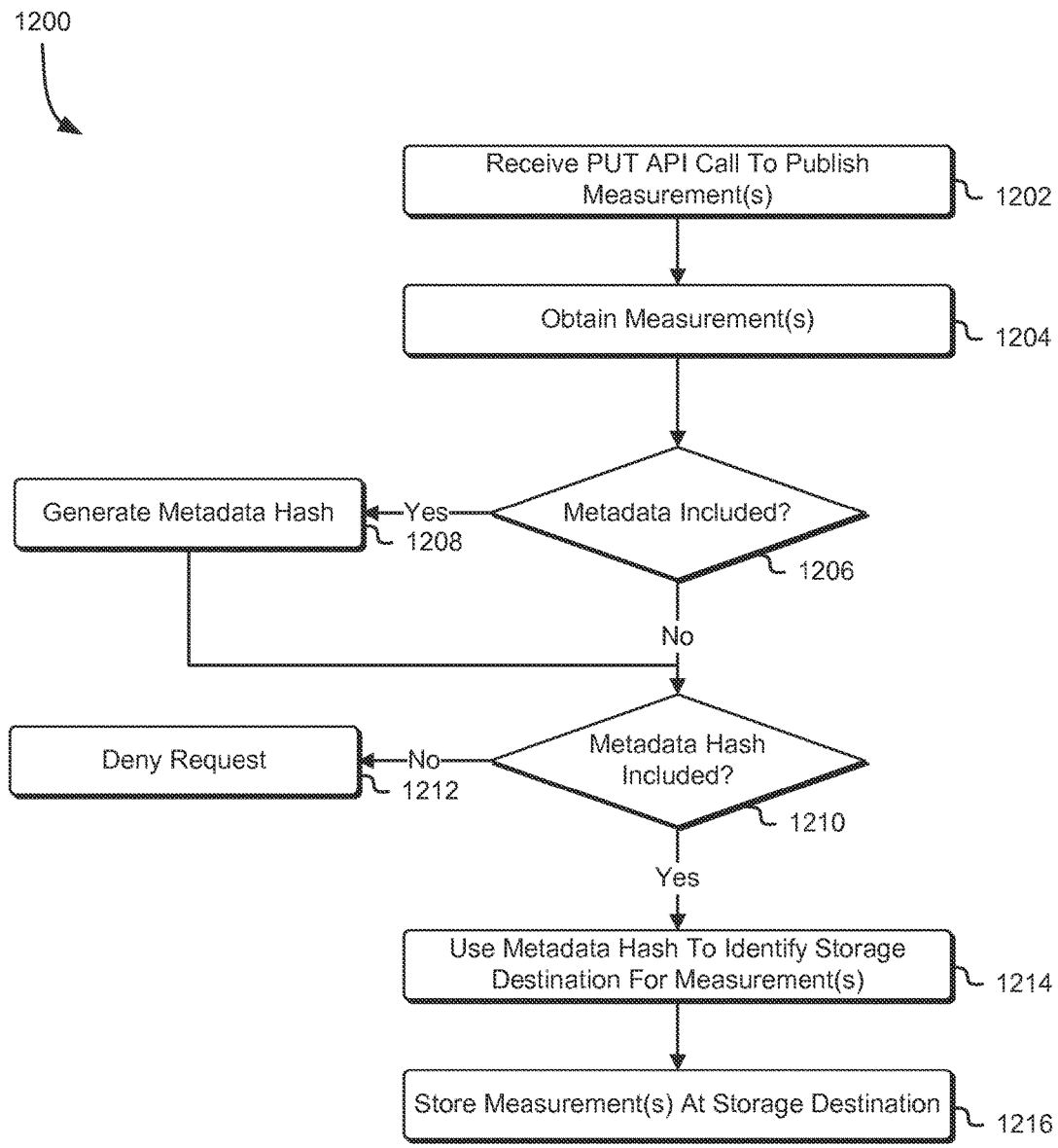
FIG. 12 shows an illustrative example of a process for storing measurements in one or more aggregator datastores based at least in part on a metadata hash in accordance with at least one embodiment.

As noted above, once the computing resource monitoring service has hashed the metadata to generate the FQMI for the measurement to be stored, the customer computer system may no longer required to repeat the metadata for future submissions of the measurements for the particular metric, so long as the metadata has not expired or the customer computer system has not initiated a new session with the computing resource monitoring service. For instance, when customer computer system supplies additional measurements to the computing resource monitoring service, the customer computer system may provide the FQMI for the measurements corresponding to the same metric instead of the metadata. The computing resource monitoring service may serialize the measurements and the FQMI in anticipation of storage of the various measurements within the in-memory datastores of the computing resource monitoring service. Accordingly, FIG. 12 shows an illustrative example of a process 1200 for storing measurements in one or more aggregator datastores based at least in part on a metadata hash in accordance with at least one embodiment. The process 1200 may be performed by the aforementioned computing resource monitoring service, which may obtain requests to store measurements that may include either the metadata for the measurements or the FQMIs for each measurement.

At any point, the computing resource monitoring service may receive 1202 a PUT API call to publish a measurement within an aggregator datastore. This PUT API call may include the measurement to be stored, as well as metadata for the measurement or an FQMI for the measurement. Thus, through the PUT API call, the computing resource monitoring service may obtain 1204 the measurement that is to be stored within an aggregator datastore. The computing resource monitoring service may further determine 1206 whether the PUT API call includes metadata for the measurement to be stored. For instance, the metadata may include one or more metric attributes that may uniquely identify the associated measurement and metric within the computing resource monitoring service. For example, the metadata may specify, individually or in combination, the account number of a customer associated with the customer computer system submitting the PUT request or with another computing resource responsible for generation of the measurement, the name of the particular service responsible for managing the computing resource (e.g., virtual computer system service, database service, etc.), the dimensions for the measurement (e.g., key/value pairs), and an identifier for the computing resource producing the measurement.

If the PUT API call includes the metadata for the measurement, the computing resource monitoring service may utilize a hash function and the provided metadata to generate 1208 a metadata hash, which may include FQMI for the measurement. This FQMI may include a multiple-byte hash, wherein a portion of the hash may be used to determine a logical partition for each measurement metric based at least in part on a mapping within a metric mapping registry of the computing resource monitoring service, while another portion of the hash may be used for unique identification of the measurement once placed within the corresponding logical partition. If the PUT API call does not include the metadata for the measurement, the computing resource monitoring service may determine 1210 whether the PUT API call includes the metadata hash (e.g., FQMI) for the measurement. If the PUT API call does not include either the metadata or the FQMI for the measurement, the computing resource monitoring service may deny 1212 the request to store the measurement. Alternatively, the computing resource monitoring service may still process the measurement but the measurement may not be obtainable by the customer computer system or other computing resource, as the measurement may not be properly indexed due to the missing metadata and FQMI.

Once the computing resource monitoring service has obtained the FQMI for the measurement, the computing resource monitoring service may utilize 1214 the FQMI to identify an in-memory storage destination for the measurement. For instance, the computing resource monitoring service may access the metric mapping registry to obtain a mapping of logical partitions to various aggregator sub-systems to determine which logical partition will be used for placement of the measurement and for delivery to an aggregator sub-system. The computing resource monitoring service may utilize the FQMI and timestamp from the serialized measurement to identify, based at least in part on the mapping, which logical partition to place the measurement in. This may enable the computing resource monitoring service to store 1216 the measurement in the appropriate storage destination, which may include an aggregator sub-system associated with the logical partition in which the measurement is placed in based at least in part on the FQMI and the timestamp of the measurement.

Figure 13:
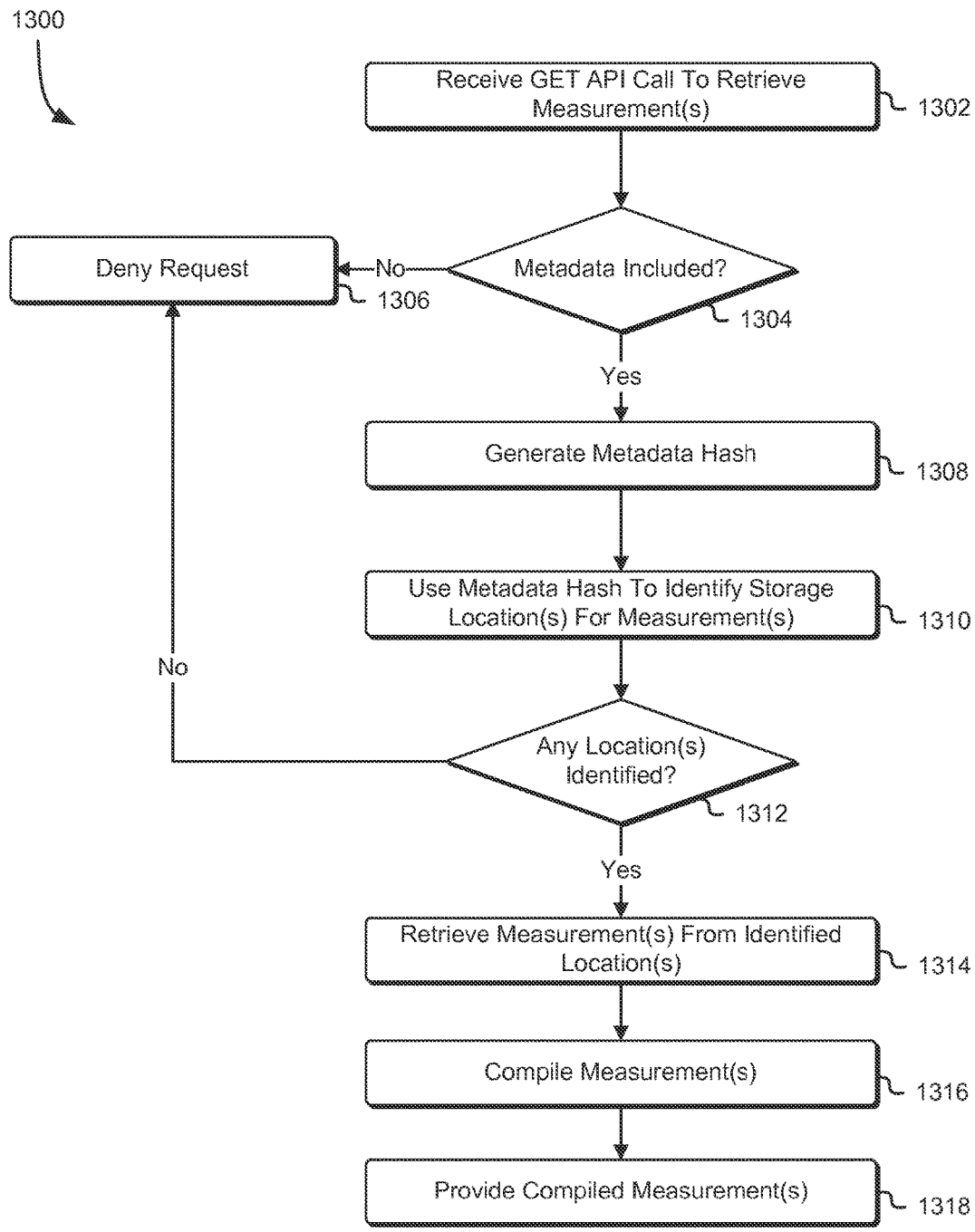
FIG. 13 shows an illustrative example of a process for retrieving measurements from one or more aggregator datastores based at least in part on metadata included within a request to obtain the measurements in accordance with at least one embodiment.

As noted above, the computing resource monitoring service may obtain various GET requests from one or more entities to retrieve measurements from the in-memory datastores. These GET requests may include metadata for the measurements to be obtained and timestamps for these measurements. This may enable the computing resource monitoring service to determine the storage locations for the measurements and provide these measurements to the requesting entity in response to a GET request. Accordingly, FIG. 13 shows an illustrative example of a process 1300 for retrieving measurements from one or more aggregator datastores based at least in part on metadata included within a request to obtain the measurements in accordance with at least one embodiment. The process 1300 may be performed by the aforementioned computing resource monitoring service.

At any point, the computing resource monitoring service may receive 1302 a GET API call to obtain one or more measurements from the computing resource monitoring service. Once the computing resource monitoring service receives the GET API call, the computing resource monitoring service may determine 1304 whether the GET API call includes metadata for the measurements to be retrieved. If the GET API call does not include metadata for the measurements to be retrieved, the computing resource monitoring service may deny 1306 the request. However, if the GET API call does include metadata for the measurements to be obtained, the computing resource monitoring service may utilize a hash function and the metadata to generate 1308 one or more FQMIs (e.g., metadata hashes) for measurements to be obtained from one or more aggregator datastores of the computing resource monitoring service.

Once the computing resource monitoring service generates the one or more FQMIs for the measurements to be obtained, the computing resource monitoring service may access a metric mapping registry and utilize 1310 the generated one or more FQMIs to identify any in-memory storage locations (e.g., aggregator datastores) where the measurements may be stored. For instance, the computing resource monitoring service may obtain a mapping of measurements to aggregated datastores from the metrics mapping registry and utilize the FQMIs to determine 1312 the location of the aggregated datastores that may include the requested measurements. If the computing resource monitoring service is unable to identify any in-memory storage locations for the requested measurements (e.g., the measurements have expired, etc.), the computing resource monitoring service may deny 1306 the request.

If the computing resource monitoring service is able to identify one or more in-memory storage locations for the requested measurements, the computing resource monitoring service may retrieve 1314 the requested measurements from the identified locations and compile 1316 the measurements for delivery to the requesting entity. For instance, the computing resource monitoring service may obtain the measurements from the various aggregator sub-systems from each datacenter where the measurements may have been redundantly stored. If the obtained measurements from the one or more datacenters are not identical, the computing resource monitoring service may utilize one or more conflict resolution rules to determine the appropriate response to the GET API call. For instance, the computing resource monitoring service may select the response with the highest sample count from the various datacenters. The computing resource monitoring service may provide 1318 a response to the GET request in the form of the compiled measurements in a de-serialized format that may be used by the requesting entity for its own purposes.

Figure 14:
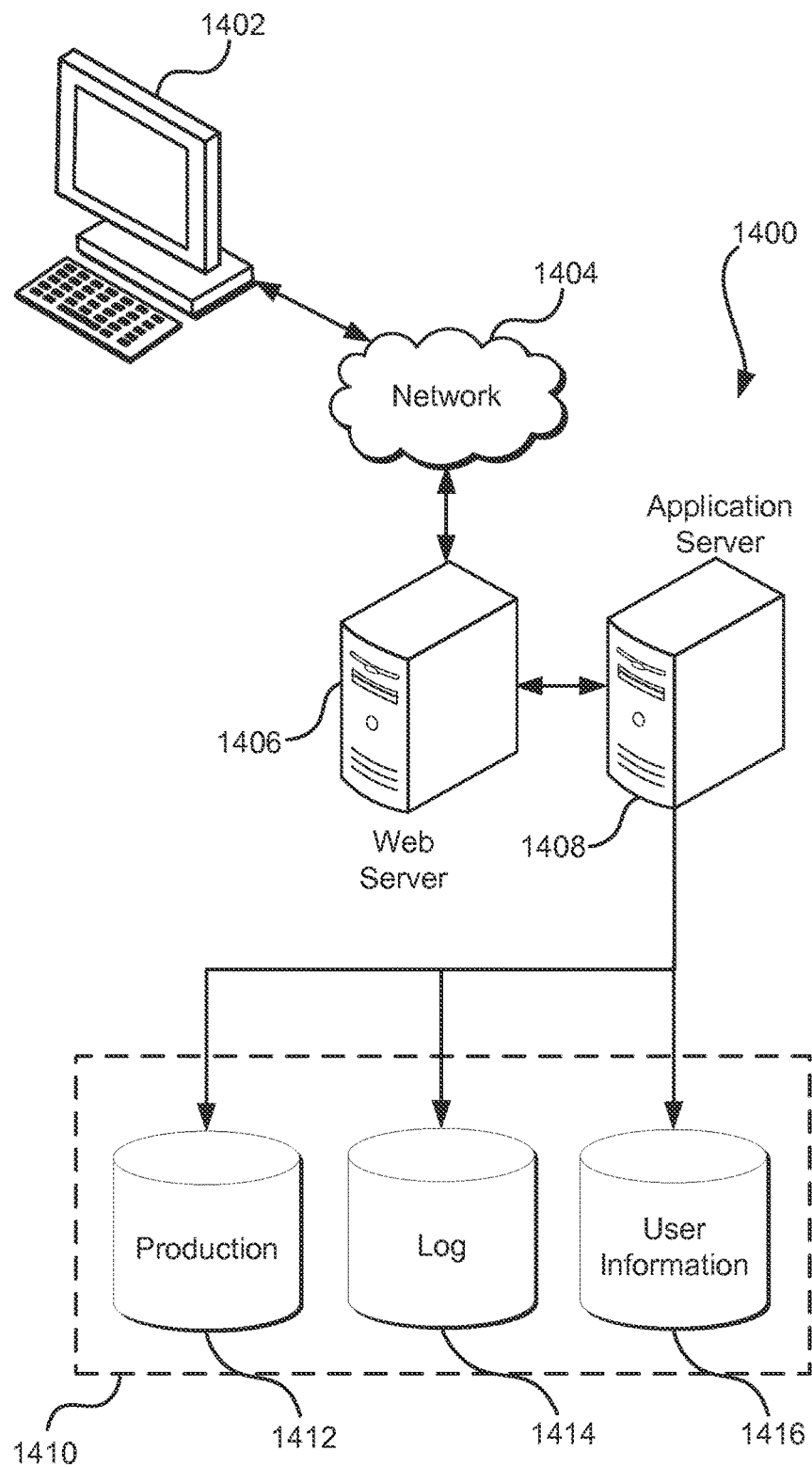
FIG. 14 shows an illustrative example of an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1402 and the application server 1408, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle ®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, from a customer computer system, a request to store a first plurality of measurements for a metric obtained within a time period for the metric, the request including the first plurality of measurements and metadata specifying attributes of the first plurality of measurements;
utilizing, for the first plurality of measurements, a hash function and the metadata to generate a fully qualified metric identifier for the first plurality of measurements;
determining, based at least in part on the fully qualified metric identifier and a timestamp for the first plurality of measurements, one or more datastores for the first plurality of measurements;
storing the first plurality of measurements within the determined one or more datastores;
receiving, from the customer computer system, a second request to store a second plurality of measurements specifying measurements obtained within the time period for the metric, the second request including the second plurality of measurements and the fully qualified metric identifier but lacking at least a portion of the metadata;
utilizing the fully qualified metric identifier and timestamps for the second plurality of measurements to make a determination where to store the second plurality of measurements, wherein at least a portion of the fully qualified metric identifier identifies the one or more datastores where the first plurality of measurements was stored, while another portion of the metric identifier is used for unique identification of the first plurality of measurements within the one or more datastores; and storing the second plurality of measurements according to the determination.

2. The computer-implemented method of claim 1, further comprising:

receiving, from the customer computer system, a third request to retrieve the first plurality of measurements, the third request including the fully qualified metric identifier; and using the fully qualified metric identifier to obtain the first plurality of measurements from the one or more datastores for the measurements.

3. The computer-implemented method of claim 1, further comprising utilizing run length encoding to compress the first plurality of measurements and the second plurality of measurements for one or more sequential measurements having a same value.

4. The computer-implemented method of claim 1, further comprising aggregating the first plurality of measurements with the second plurality of measurements if the determination is to store the second plurality of measurements in the same one or more datastores as the first plurality of measurements.

5. A system, comprising at least one computing device configured to implement one or more services, wherein the one or more services are configured to:

receive a request to store a plurality of measurements for a metric, the request not having the same metadata that was received with an earlier request to store other measurements for the metric but having a metric identifier generated by a hash function and metadata associated the other measurements for the metric;

determine, based on the metric identifier and a timestamp for the plurality of measurements, one or more partitions for the plurality of measurements; and use the metric identifier to store the plurality of measurements such that information responsive to the request to retrieve measurements for the metric that specifies the metadata that was received with the earlier request includes at least both the plurality of measurements and the other measurements, wherein at least a portion of the metric identifier identifies the one or more partitions where the plurality of measurements will be stored, while another portion of the metric identifier is used for unique identification of the plurality of measurements within the one or more partitions.

6. The system of claim 5, wherein the one or more services are further configured to aggregate the plurality of measurements with the other measurements based at least in part on the determined metric identifier.

7. The system of claim 5, wherein use of the determined metric identifier to store the metrics data includes:

transmitting the plurality of measurements from the one or more partitions to one or more aggregator sub-system of a plurality of aggregator sub-systems for storage of the plurality of measurements; and storing the plurality of measurements within one or more aggregator datastores of the one or more aggregator sub-systems.

8. The system of claim 7, wherein the one or more services are further configured to:

obtain, from a metric mapping registry and based at least in part on timestamps for the measurements of the plurality of measurements, one or more mappings between the one or more partitions and the plurality of aggregator sub-systems; and select the one or more aggregator sub-systems from the plurality of aggregator sub-systems based at least in part on the one or more mappings.

9. The system of claim 5, wherein the one or more services are further configured to:

receive a second request to retrieve the plurality of measurements, the request specifying the metadata;

determine the metric identifier based at least in part on the metadata; and retrieve, through use of the metric identifier and one or more time periods specified in the metadata, at least both the plurality of measurements and the other measurements.

10. The system of claim 5, wherein the plurality of measurements are stored in a binary serialization format, the binary serialization format including the metric identifier, a timestamp for the metrics data, a unit of measurement for the metrics data, and a measurement for a metric represented by the metrics data.

11. The system of claim 5, wherein the metric identifier is generated through use of a hash function and one or more metric attributes specified within the metadata.

12. A non-transitory computer-readable storage medium having stored thereon executable instructions that, as a result of execution by one or more processors of a computer system, cause the computer system to at least:

receive a first application programming interface call to store one or more measurements for a metric, the first application programming interface call specifying the one or more measurements and a metric identifier for the one or more measurements, the metric identifier generated using a hash function and metadata associated with other measurements for the metric included in an earlier request to store the other measurements for the metric;

utilize the metric identifier and a timestamp for the one or more measurements to identify a datastore for storing the one or more measurements, wherein at least a portion of the metric identifier identifies the datastore, while another portion of the metric identifier is used for unique identification of the one or more measurements within the datastore; and store the one or more measurements in the identified datastore such that the one or more measurements and the other measurements can be obtained in response to a request that includes the metadata associated with the earlier request or the metric identifier for the one or more measurements.

13. The non-transitory computer-readable storage medium of claim 12, wherein the instructions further cause the computer system to:

receive a second application programming interface call to retrieve a plurality of measurements for the metric, the second application programming interface call including the metadata;

generate, using the included metadata, the metric identifier;

identify, based at least in part on the generated metric identifier and one or more time periods specified in the metadata, one or more datastores that include the one or more measurements and the other measurements; and provide the one or more measurements and the other measurements from the identified one or more datastores.

14. The non-transitory computer-readable storage medium of claim 12, wherein the instructions further cause the computer system to transform the one or more measurements into a binary serialization format, the one or more measurements in the binary serialization format including the metric identifier and the measurement.

15. The non-transitory computer-readable storage medium of claim 14, wherein storing the one or more measurements in the identified datastore includes:
retrieving, from the datastore, serialized measurements for the metric, the serialized measurements including the other measurements in the binary serialization format;
de-serializing the serialized measurements and the one or more measurements in the binary serialization format;
aggregating the one or more measurements with the other measurements; and
transforming the one or more measurements and the other measurements into the binary serialization format.

16. The non-transitory computer-readable storage medium of claim 14, wherein the instructions further cause the computer system to utilize run length encoding to compress the one or more measurements for one or more sequential measurements having a same value in the binary serialization format.

17. The non-transitory computer-readable storage medium of claim 12, wherein the instructions further cause the computer system to:
generate, based at least in part on the metric identifier and a timestamp of the one or more measurements, a partition;
place the one or more measurements in the logical partition into a queue for distribution to an aggregator sub-system, the aggregator sub-system including the identified datastore; and
transmit, from the queue, the one or more measurements to the aggregator sub-system for storage of the one or more measurements in the identified datastore.

18. The non-transitory computer-readable storage medium of claim 17, wherein the instructions further cause the computer system to:
obtain, from a metric mapping registry, a mapping between partitions and aggregator sub-systems over time; and
utilize the metric identifier and the timestamp of the metrics data to determine, from the mapping, the aggregator sub-system for storage of the one or more measurements into the identified datastore.

19. The non-transitory computer-readable storage medium of claim 12, wherein the metric identifier is generated through use of a hash function to hash one or more metric attributes specified in the metadata included with the request to store the other measurements.

\* \* \* \* \*